(12) United States Patent
Liu et al.

(10) Patent No.: US 11,178,720 B2
(45) Date of Patent: Nov. 16, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Liqing Liu, Sakai (JP); Shoichi Suzuki, Sakai (JP); Tomoki Yoshimura, Sakai (JP); Wataru Ouchi, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/483,097

(22) PCT Filed: Feb. 1, 2018

(86) PCT No.: PCT/JP2018/003411
§ 371 (c)(1),
(2) Date: Aug. 2, 2019

(87) PCT Pub. No.: WO2018/143346
PCT Pub. Date: Aug. 9, 2018

(65) Prior Publication Data
US 2020/0236732 A1 Jul. 23, 2020

(30) Foreign Application Priority Data
Feb. 6, 2017 (JP) .............................. JP2017-019385

(51) Int. Cl.
*H04W 76/27* (2018.01)
*H04W 24/10* (2009.01)
*H04W 72/04* (2009.01)

(52) U.S. Cl.
CPC ........... *H04W 76/27* (2018.02); *H04W 24/10* (2013.01); *H04W 72/042* (2013.01); *H04W 72/0446* (2013.01)

(58) Field of Classification Search
CPC ............ H04W 72/042; H04W 72/0446; H04L 5/0053; H04L 5/001; H04L 5/0094
See application file for complete search history.

(56) References Cited

U.S. PATENT DOCUMENTS

2011/0026449 A1\* 2/2011 Kuo ...................... H04L 5/0053
370/311
2018/0049222 A1\* 2/2018 Manolakos ......... H04L 27/2602
(Continued)

OTHER PUBLICATIONS

NTT DOCOMO, "New SID Proposal: Study on New Radio Access Technology", 3GPP TSG RAN Meeting #71, RP-160671, Mar. 7-10, 2016, 8 pages.
(Continued)

*Primary Examiner* — Jung H Park
(74) *Attorney, Agent, or Firm* — ScienBiziP, P.C.

(57) ABSTRACT

A terminal apparatus receives higher layer signaling and a PDCCH. The higher layer signaling includes an RRC parameter for indicating a slot in which the PDCCH is to be monitored. The PDCCH includes slot structure information. The slot structure information indicates a slot structure for a slot n next to a slot in which the PDCCH is received. The terminal apparatus controls whether or not to monitor a PDCCH in the slot n, based on at least the RRC parameter and the slot structure information.

8 Claims, 10 Drawing Sheets

(56) References Cited

U.S. PATENT DOCUMENTS

2019/0349878 A1\* 11/2019 Ashraf .................. H04L 1/0009
2020/0288482 A1\* 9/2020 Yi ......................... H04L 5/0053

OTHER PUBLICATIONS

Huawei et al., "On control signaling for duplexing flexibility", 3GPP TSG RAN WG1 NR Ad-Hoc Meeting, R1-1700079, Jan. 16-20, 2017, 3 pages.

\* cited by examiner

FIG. 4A

| 'slot structure' field (2 bits) | 00 | 01 | 10 | 11 |
|---|---|---|---|---|
| Slot structure information | DL-only | DL-centric | UL-centric | Reserved/blank |

FIG. 4B

| 'slot structure' field (2 bits) | 00 | 01 | 10 | 11 |
|---|---|---|---|---|
| Slot structure information | DL-only | DL-centric | UL-centric | UL-only |

FIG. 4C

| 'slot structure' field (1 bits) | 0 | 1 |
|---|---|---|
| Slot structure information | Type A | Type B |

| Value of 'Slot structure' field in current slot | Configuration of slot structure (current slot, next slot) |
|---|---|
| 000 | (DL-only, Type A) |
| 001 | (DL-only, Type B) |
| 010 | (DL-centric, Type A) |
| 011 | (DL-centric, Type B) |
| 100 | (UL-centric, Type A) |
| 101 | (UL-centric, Type B) |
| 110 | Reserved |
| 111 | Reserved |

FIG. 5

Slot n−1, Slot n, Slot n+1

- DOWNLINK ONLY SLOT
- DOWNLINK CENTRIC SLOT
- UPLINK CENTRIC SLOT
- UPLINK ONLY SLOT

Slot n−1, Slot n, Slot n+1

- SLOT IN WHICH GROUP COMMON PDCCH IS MONITORED
- SLOT IN WHICH GROUP COMMON PDCCH IS NOT MONITORED

| Slot configuration field | Slot symbols configuration | DL Duration | GP | UL Duration |
|---|---|---|---|---|
| 00 | 0 | S1 | S2 | S3 |
| 01 | 1 | S4 | S5 | S6 |
| 10 | 2 | S7 | S8 | S9 |
| 11 | 3 | S10 | S11 | S12 |

| Slot Configuration field | Slot symbols configuration | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| 00 | 0 | D | D | D | D | D | D | D | D | D | D | D | D | D | D |
| 01 | 1 | D | D | D | D | D | D | D | D | D | D | D | D | D | D |
| 10 | 2 | D | D | D | D | D | D | D | D | D | D | D | D | G | G |
| 11 | 3 | D | D | D | D | D | G | G | D | D | D | D | D | D | D |

FIG. 8B

| Slot Configuration field | Slot symbols configuration | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| 00 | 0 | D | D | D | D | D | D | D | D | D | D | D | D | D | D |
| 01 | 1 | D | D | D | D | D | D | D | D | D | D | D | G | D | U |
| 10 | 2 | D | D | D | D | D | D | D | D | D | G | G | D | D | G |
| 11 | 3 | D | D | D | D | D | G | G | D | D | D | G | G | D | G |

FIG. 8C

| Slot Configuration field | Slot symbols configuration | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| 00 | 0 | D | D | D | D | D | D | D | D | U | U | U | U | U | U |
| 01 | 1 | D | D | D | G | D | D | D | D | U | G | G | U | U | U |
| 10 | 2 | D | G | G | G | G | D | D | G | G | G | G | U | U | G |
| 11 | 3 | D | D | D | G | G | G | G | D | D | G | G | G | U | U |

FIG. 8D

| Slot Configuration field | Slot symbols configuration | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| 00 | 0 | U | U | U | U | U | U | U | U | U | U | U | U | U | U |
| 01 | 1 | U | U | U | U | U | U | U | G | U | U | U | U | U | U |
| 10 | 2 | U | U | U | U | U | U | G | U | U | U | U | U | G | U |
| 11 | 3 | G | U | U | U | U | U | U | U | U | U | U | U | U | G |

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2017-019385 filed on Feb. 6, 2017, the contents of which are incorporated herein by reference.

BACKGROUND ART

A radio access method and a radio network for cellular mobile communications (hereinafter referred to as "Long Term Evolution (LTE: trade name)," or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas covered by a base station apparatus are deployed in a cellular structure. A single base station apparatus may manage multiple cells.

In 3GPP, a next generation standard (New Radio) (NR) has been studied, in view of making a proposition to International Mobile Telecommunication (IMT)-2020, which is a standard of a next generation mobile communication system developed by the International Telecommunication Union (ITU) (NPL 1). In NR, notification of slot structure information of a slot has been studied (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.

NPL 2: "On control signaling for duplexing flexibility", R1-1700079, Huawei, HiSilicon, 3GPP TSG RAN WG1 NR Ad-Hoc Meeting, Spokane, USA, 16-20 Jan. 2017.

SUMMARY OF INVENTION

Technical Problem

According to one aspect of the present invention, a terminal apparatus capable of efficiently monitoring a downlink, a communication method used in the terminal apparatus, and an integrated circuit to be mounted in the terminal apparatus are provided.

Solution to Problem (1) The present invention is contrived to provide the following measures. Specifically, a first aspect of the present invention is a terminal apparatus including a receiver configured to receive higher layer signaling and a PDCCH, the higher layer signaling including an RRC parameter for indicating a slot in which the PDCCH is to be monitored, the PDCCH including slot structure information, the slot structure information indicating a slot structure for a slot n next to a slot in which the PDCCH is received; and a controller configured to control whether or not to monitor a PDCCH in the slot n, based on at least the RRC parameter and the slot structure information.

(2) A second aspect of the present invention is a base station apparatus for communicating with a terminal apparatus including: a transmitter configured to transmit a PDCCH including slot structure information and RRC signaling, the RRC signaling including an RRC parameter for indicating to a terminal apparatus whether to monitor the PDCCH in a slot n, the slot structure information included in the PDCCH transmitted in a slot n−1 indicating a slot structure of the slot n; and a generation unit configured to configure the slot structure information of the slot n according to whether the slot n is for downlink transmission or uplink reception for the slot n.

(3) A third aspect of the present invention is a communication method used by a terminal apparatus, the communication method including: receiving higher layer signaling and a PDCCH, the higher layer signaling including an RRC parameter for indicating a slot in which the PDCCH is to be monitored, the PDCCH including slot structure information, the slot structure information indicating a slot structure for a slot n next to a slot in which the PDCCH is received; and controlling whether or not to monitor the PDCCH in the slot n, based on at least the RRC parameter and the slot structure information.

(4) A fourth aspect of the present invention is a communication method used by a base station apparatus for communicating with a terminal apparatus, the communication method including: transmitting a PDCCH including slot structure information and RRC signaling, the RRC signaling including an RRC parameter for indicating to a terminal apparatus whether to monitor the PDCCH in a slot n, the slot structure information included in the PDCCH transmitted in a slot n−1 indicating a slot structure of the slot n; and configuring the slot structure information of the slot n, according to whether the slot n is for downlink transmission or uplink reception.

(5) A fifth aspect of the present invention is an integrated circuit to be mounted in a terminal apparatus, the integrated circuit including: a receiver circuit configured to receive higher layer signaling and a PDCCH, the higher layer signaling including an RRC parameter for indicating a slot in which the PDCCH is to be monitored, the PDCCH including slot structure information, the slot structure information indicating a slot structure for a slot n next to a slot in which the PDCCH is received; and a control circuit configured to control whether or not to monitor the PDCCH in the slot n, based on at least the RRC parameter and the slot structure information.

(6) A sixth aspect of the present invention is an integrated circuit to be mounted in a base station apparatus, the integrated circuit including: a transmitter circuit configured to transmit a PDCCH including slot structure information and RRC signaling, the RRC signaling including an RRC parameter for indicating to a terminal apparatus whether to monitor the PDCCH in a slot n, the slot structure information included in the PDCCH transmitted in a slot n−1 indicating a slot structure of the slot n; and a generator circuit configured to configure the slot structure information of the slot n, according to whether the slot n is for downlink transmission or uplink reception.

Advantageous Effects of Invention

According to one aspect of the present invention, a terminal apparatus is capable of efficiently monitoring a downlink.

BRIEF DESCRIPTION OF DRAWINGS

FIGS. 4A to 4C are examples of a field mapped to a slot structure according to the present embodiment.

FIG. 5 is another example of a field mapped to a slot structure according to the present embodiment.

FIG. 7 is a diagram illustrating an example of a slot configuration according to the present embodiment.

FIGS. 8A to 8D are diagrams illustrating other examples of a slot configuration according to the present embodiment.

DESCRIPTION OF EMBODIMENTS

An embodiment of the present invention will be described below.

Figure 1:
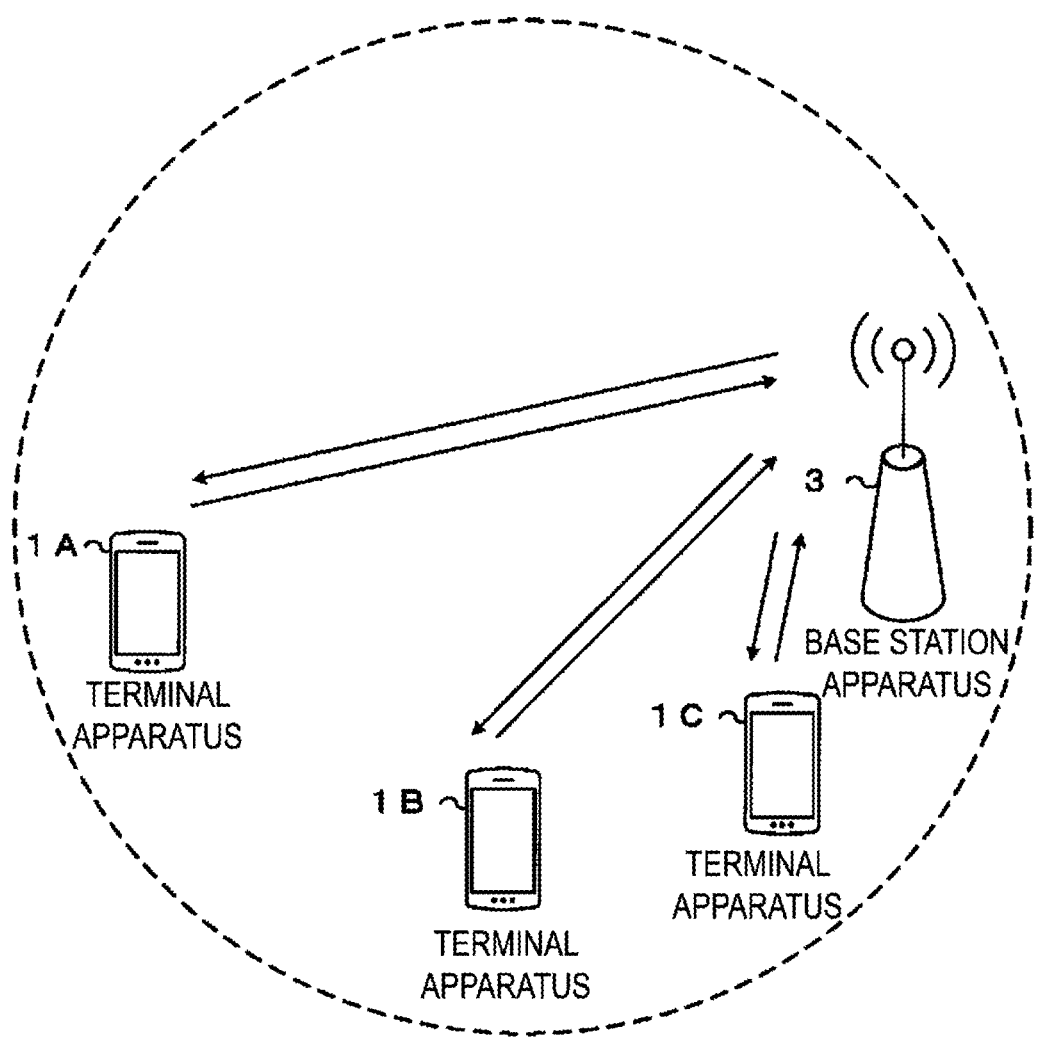
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C, and a base station apparatus 3. Each of the terminal apparatuses 1A to 1C is hereinafter referred to as a terminal apparatus 1.

The base station apparatus 3 may be referred to as a base station, a base station apparatus, a node B, an eNB (EUTRAN NodeB, evolved NodeB), or a gNB. The terminal apparatus 1 may be referred to as a terminal, a terminal apparatus, a mobile station, a user apparatus, or a User equipment (UE).

The base station apparatus 3 manages a cell, which is an area in which the terminal apparatuses 1 can communicate with the base station apparatus 3, for each frequency. One base station apparatus 3 may manage multiple cells. Cells are classified into multiple types of cells, depending on the size of the area (cell size) allowing communication with terminal apparatuses 1. For example, cells are classified into a macro cell and a small cell. Small cells are classified into a femto cell, a pico cell, and a nano cell, depending on the size of an area of a small cell. In a case that the terminal apparatus 1 can communicate with a certain base station apparatus 3, among cells of the base station apparatus 3, a cell configured to be used for communication with the terminal apparatus 1 is referred to as a "Serving cell," while the other cells not used for communication are referred to as "Neighboring cells."

A carrier corresponding to a serving cell in a downlink is referred to as a downlink component carrier. A carrier corresponding to a serving cell in an uplink is referred to as an uplink component carrier. The downlink component carrier and the uplink component carrier are collectively referred to as a component carrier. The terminal apparatus 1 can perform simultaneous transmission and/or reception on multiple physical channels in multiple serving cells (component carriers). Transmission of one physical channel may be performed in one serving cell (component carrier) out of multiple serving cells (component carriers).

A cell supporting a Next Generation Radio Access Technology (NR) is also referred to as an NR cell. A carrier of the NR cell is referred to as an NR carrier. A component carrier of the NR cell is also referred to as an NR component carrier. The NR cell may include a licensed band. The NR cell may include an unlicensed band.

The length (time length, duration) of each of a subframe, a slot, a mini-slot, and a symbol may be prescribed (defined, configured) in the NR cell, the NR carrier, and/or the NR component carrier. Here, the symbol may be a Single Carrier-Frequency Division Multiple Access (SC-FDMA) symbol, or an Orthogonal Frequency Division Multiplexing (OFDM) symbol. Note that the mini-slot may be referred to as a subslot. The OFDM may be referred to as Cyclic Prefix-OFDM (CP-OFDM). The SC-FDMA may be Discrete Fourier Transform-Spread-OFDM (DFT-S-OFDM).

Next, a subframe according to the present embodiment will be described. The length (time length, duration) of the subframe according to the present embodiment may be 1 ms. Each of radio frames may be 10 ms. In other words, each of radio frames may include 10 subframes.

The number of symbols included in one subframe may be prescribed based on a Subcarrier Spacing for physical channels used for transmission and/or reception. For example, in a case that the subcarrier spacing is 15 kHz, the number of symbols included in one subframe may be 14 symbols. In a case that the subcarrier spacing is 30 kHz, the number of symbols included in one subframe may be 28 symbols. The subframe may include one or multiple slots.

Next, a slot and a mini-slot according to the present embodiment will be described. The slot may include one or more than one mini-slot, and/or one or more than one physical channel, and/or one or more than one symbol. The length (time length) of one slot may be prescribed based on the number of symbols constituting one slot, the length of one symbol, or the length of one CP provided to the one symbol. The length of the one symbol and the length of the one CP may be prescribed in association with a subcarrier spacing applied to a slot. In other words, the length of a symbol and a CP used for a slot may be configured or prescribed separately from a subframe.

Here, the number of symbols constituting one slot may be prescribed based on a subcarrier spacing used for configuration of a slot. For example, in a case that a subcarrier spacing is 60 kHz or below 60 kHz, the number of symbols constituting one slot may be 7 symbols or 14 symbols. In a case that a subcarrier spacing exceeds 60 kHz, the number of symbols constituting one slot may be 14 symbols. The number of symbols constituting one slot may be configured separately from the number of symbols constituting one subframe. For example, the number of symbols constituting one slot may be configured via common and/or separate higher layer signaling. The number of symbols constituting one slot may be configured via common and/or separate physical layer signaling.

Next, a mini-slot according to the present embodiment will be described. The mini-slot may include one or more than one symbol. The length (time length) of one mini-slot may be prescribed based on the number of symbols constituting one mini-slot, the length of one symbol, or the length of one CP provided to the one symbol. The length of the one symbol and the length of the one CP may be prescribed in association with a subcarrier spacing applied to a mini-slot. In other words, the length of a symbol and a CP used for a mini-slot may be configured or prescribed separately from a subframe and a slot.

Here, the number of symbols constituting one mini-slot may be a number smaller than the number of symbols constituting a slot. The number of symbols constituting one mini-slot may be prescribed or configured based on the number of symbols constituting one slot. The number of symbols constituting one mini-slot may be configured separately from the number of symbols constituting one slot. For example, the number of symbols constituting one mini-slot may be configured via common and/or separate higher layer signaling. The number of symbols constituting one mini-slot may be configured via common and/or separate physical layer signaling. Note that, in a case that more than one mini-slot can be included in a subframe, it is preferable that, among mini-slots included in one subframe, the number of symbols constituting one mini-slot be a common number or the same number at least in one subframe. The number of symbols constituting one mini-slot may be prescribed in association with a subcarrier spacing applied to or configured for the mini-slot.

Figure 2:
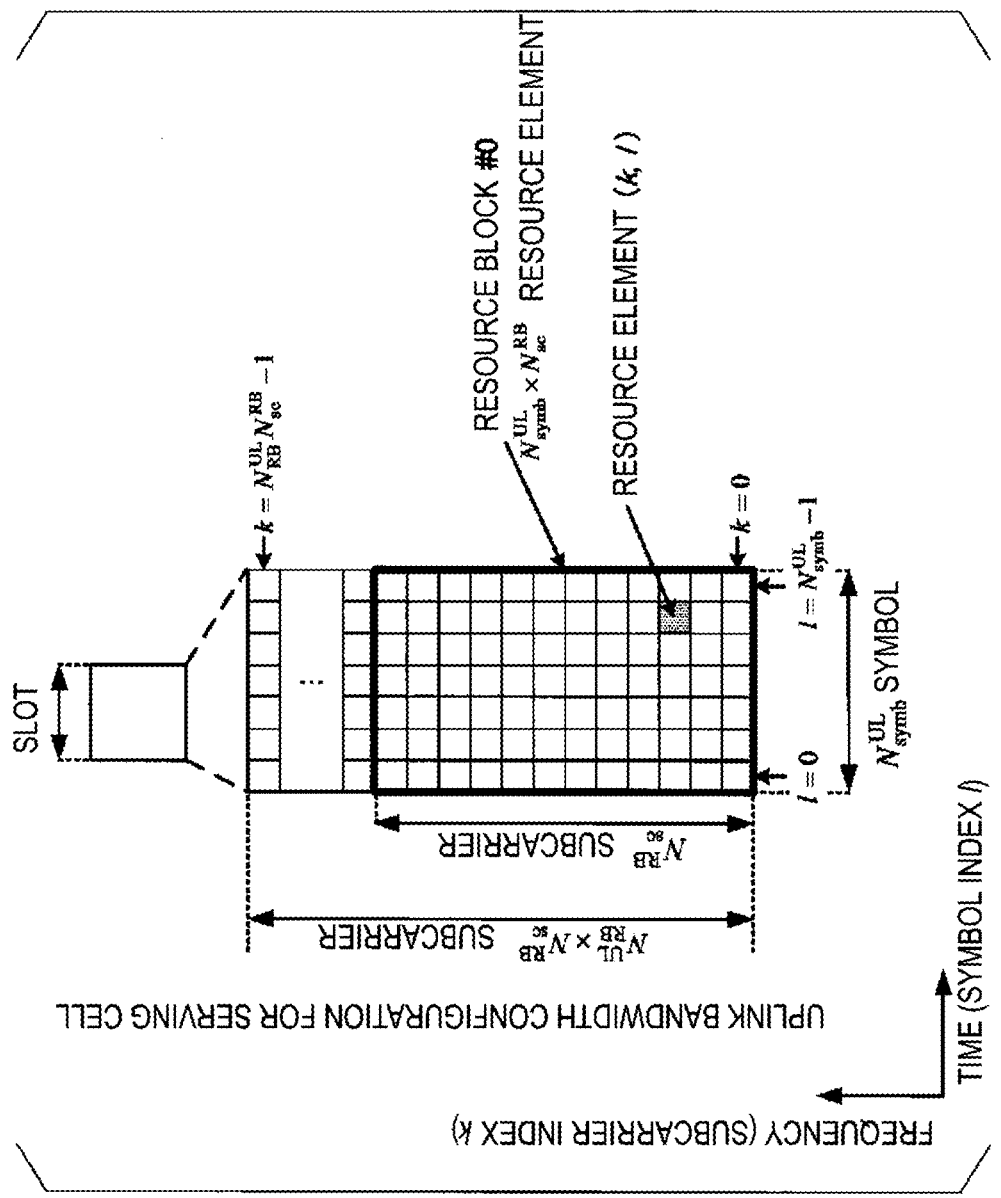
FIG. 2 is a diagram illustrating a schematic configuration of an uplink resource block according to the present embodiment.

Next, a resource block according to the present embodiment will be described. FIG. 2 is a diagram illustrating a schematic configuration of an uplink resource block according to the present embodiment. FIG. 2 illustrates a configuration of an uplink resource block in one cell. In FIG. 2, the horizontal axis represents a time axis, and the vertical axis represents a frequency axis. In FIG. 2, 1 represents a symbol number/index, and k represents a subcarrier number/index.

A resource block (RB) is used to indicate mapping of a physical channel to resource elements. The Resource Element (RE) includes one sub-carrier and one symbol. Regarding the resource block, a virtual resource block (VRB) and a physical resource block (PRB) are defined. A physical channel is first mapped to a virtual resource block. After that, the virtual resource block is mapped to a physical resource block. One physical resource block is defined by $N^{UL}_{symb}$ consecutive symbols in the time domain and $N^{RB}_{sc}$ consecutive subcarriers in the frequency domain. Hence, one physical resource block includes ($N^{UL}_{symb} \times N^{RB}_{sc}$) resource elements. A value of $N^{RB}_{sc}$ may be 12. For a normal Cyclic Prefix (CP) in the uplink, the value of $N^{UL}_{symb}$ may be 7. The value of $N^{UL}_{symb}$ may be 14. For an extended CP in the uplink, the value of $N^{UL}_{symb}$ may be 6. The value of $N^{UL}_{symb}$ may be 12.

One physical resource block may correspond to one slot in the time domain, based on a subcarrier spacing. One physical resource block may correspond to a half of a slot in the time domain, based on a subcarrier spacing. The number of symbols constituting one physical resource block may be prescribed based on a subcarrier spacing. For example, in a case that the subcarrier spacing is 15 kHz, the number of symbols constituting one physical resource block may be prescribed to be 7. For example, in a case that the subcarrier spacing is 30 kHz, the number of symbols constituting one physical resource block may be prescribed to be 14.

In the time domain, the number of symbols constituting one physical resource block may be the number of symbols used for transmission or reception of a physical channel. The physical resource blocks are assigned numbers n PRB (0, 1, . . . , $N^{UL}_{RB}$-1) in ascending order of frequencies in the frequency domain.

Here, the subcarrier spacing may be any of 3.75 kHz, 7.5 kHz, 15 kHz, 30 kHz, 60 kHz, 120 kHz, and 240 kHz. It is obvious that a narrower subcarrier spacing yields a longer symbol length, and that a wider subcarrier spacing yields a shorter symbol length.

In the time domain, symbols constituting an uplink physical resource block are SC-FDMA (DFT-S-OFDM) symbols or OFDM symbols. In the time domain, symbols constituting a downlink physical resource block are OFDM symbols. Except for this difference, the configuration of the downlink physical resource block according to the present embodiment is basically the same as the configuration of the uplink physical resource block. Thus, description of the configuration of the downlink physical resource block is omitted.

Next, a physical channel and a physical signal according to the present embodiment will be described. A physical channel and a physical signal related to the downlink may be referred to as a downlink physical channel and a downlink physical signal, respectively. A physical channel and a physical signal related to the uplink may be referred to as an uplink physical channel and an uplink physical signal, respectively.

In the present embodiment, the physical channel includes at least a part or all of a broadcast channel, a random access channel, a control channel, and a shared (common) channel. The broadcast channel is hereinafter also referred to as a physical broadcast channel. The control channel is also referred to as a physical control channel. The shared channel is also referred to as a physical shared channel.

For example, the physical channel for the downlink may be used to transmit broadcast information, system information, paging information, various pieces of configuration information, an Acknowledgement (ACK)/Negative Acknowledgement (NACK), user data, and control data. A resource allocation method and a sequence generation method used for the physical channel may be defined, depending on usage. The downlink user data may include downlink shared data. The downlink shared channel may be used for transmission of at least downlink user data. For example, the control channel may be transmitted with at least a part of control data included in the control channel. The control data may include Downlink Control Information (DCI). The downlink control information is also referred to as a DCI format. The control data may include a grant used for scheduling of a downlink and/or an uplink. In other words, the downlink control information includes an uplink grant and a downlink grant. For example, a control channel used for transmission of control data (DCI) may also be referred to as a Physical Downlink Control Channel (PDCCH). The broadcast information may be transmitted on a Physical Broadcast Channel (PBCH). The paging information may be transmitted on a physical paging channel. The broadcast information, the system information, and the paging information may be transmitted on a physical shared channel. The system information may be included in RRC signaling. The physical shared channel may also be referred to as a Physical Downlink Shared Channel (PDSCH) and/or a Physical Uplink Shared Channel (PUSCH). The PDSCH may be used to transmit RRC signaling and a MAC control element.

Here, the base station apparatus 3 and the terminal apparatus 1 may exchange (transmit and/or receive) signals with each other in a higher layer. For example, the base station apparatus 3 and the terminal apparatus 1 may transmit and/or receive RRC signaling (also referred to as an RRC message, RRC information) in a Radio Resource Control (RRC) layer. The base station apparatus 3 and the terminal apparatus 1 may exchange (transmit and/or receive) a MAC control element in a Medium Access Control (MAC) layer. Here, the RRC signaling and/or the MAC control element is also referred to as higher layer signaling.

In the present embodiment, a "higher layer parameter," a "higher layer message," "higher layer signaling," "higher layer information," and a "higher layer information element" may be identical.

For example, the physical signal for the downlink may be used for demodulation of a downlink physical channel, time frequency synchronization (symbol alignment, subcarrier spacing synchronization, slot synchronization, subframe synchronization), timing synchronization (timing adjustment), acquisition/detection of a cell ID, Radio Resource Management (RRM) measurement, Channel State Information (CSI) measurement, beam management and/or beam acquisition, and positioning. A resource allocation method and a sequence generation method used for the physical signal may be defined, depending on a usage. The physical signal is hereinafter also referred to as a reference signal.

For example, the physical channel for the uplink may be used to transmit capability information of a terminal apparatus, an Acknowledgement (ACK)/Negative Acknowledgement (NACK), a report of a measurement result of RRM measurement and CSI measurement, user data, control data, and a random access preamble (random access information). A resource allocation method and a sequence generation method used for the physical channel may be defined, depending on a usage. The uplink user data may include uplink shared data. The user data and/or the control data may include uplink control information (UCI). The UCI may include feedback information about a Hybrid Auto Repeat reQuest (HARQ) and CSI. The user data may be transmitted on a physical shared channel. The control data may be transmitted on a physical control channel. The random access preamble may be transmitted on a physical random access channel.

For example, the physical signal for the uplink may be used for demodulation of an uplink physical channel, time frequency synchronization, timing synchronization and timing adjustment, channel state measurement, beam management and/or beam acquisition, and positioning of a terminal apparatus. A resource allocation method and a sequence generation method used for the physical signal may be defined, depending on a usage.

The resource allocation method and the sequence generation method may be different between the downlink and the uplink. Each of the physical channels may be referred to as a physical channel including certain information or certain data.

In the downlink of the present embodiment, a "transport block," a "MAC Protocol Data Unit (PDU)," "MAC layer data," a "DL-SCH," "DL-SCH data," and "downlink data" are identical. Note that, in the uplink, a "transport block," a "MAC Protocol Data Unit (PDU)," "MAC layer data," a "UL-SCH," "UL-SCH data," and "uplink data" are identical. Each of the UL-SCH and the DL-SCH is a transport channel. A channel used in a Medium Access Control (MAC) layer is referred to as a transport channel. A unit of a transport channel used in a MAC layer is also referred to as a transport block (TB) or a MAC Protocol Data Unit (PDU).

A PDCCH according to the present embodiment will be described below.

As described above, the PDCCH may be used for transmission of at least downlink control information. The PDCCH includes a Common PDCCH and/or a UE specific PDCCH. Control information common to multiple terminal apparatuses 1 in a cell or a carrier is transmitted on the common PDCCH. Here, the common PDCCHs may be classified into a cell common PDCCH and a Group Common PDCCH. In other words, control information common to terminal apparatuses 1 in a cell may be transmitted on the cell common PDCCH. Control information common to a certain group of terminal apparatuses 1 may be transmitted on the group common PDCCH. The group common PDCCH may be used to indicate a common configuration used in multiple terminal apparatuses 1 in a group. In other words, the terminal apparatuses 1 belonging to the group can monitor (decode) the group common PDCCH. Terminal apparatuses 1 belonging to a group other than the group do not monitor (decode) the group common PDCCH. Control information dedicated to a certain terminal apparatus 1 in a cell or a carrier is transmitted on the UE-specific PDCCH. In the present embodiment, the PDCCH may be a DCI format.

A set of PDCCH candidates to be monitored by the terminal apparatus 1 is also referred to as a search space (control channel search space). Here, the PDCCH candidate may indicate a candidate of a PDCCH that may be used for mapping and/or used for transmission by the base station apparatus 3. The search space may include a Common Search Space (CSS). For example, the common search space may be defined as a space common to multiple terminal apparatuses 1. Here, the common search space may include a set of cell common PDCCH candidates. The common search space may include a set of group common PDCCH candidates. The common search space may include PDCCH candidates assigned predetermined numbers. The common search space may be provided regardless of a parameter specific to the terminal apparatus 1. The common search space may be provided through system information broadcast by the base station apparatus 3. To "monitor" may imply that the terminal apparatus 1 attempts to decode each PDCCH in the set of PDCCH candidates, according to all DCI formats to be monitored.

The search space may include a UE-specific Search Space (USS). For example, the UE-specific search space may be provided based on at least a C-RNTI allocated to the terminal apparatus 1. The terminal apparatus 1 may monitor PDCCHs in a common search space and/or a UE-specific search space to detect a PDCCH addressed to the terminal apparatus 1.

Here, an RNTI allocated to the terminal apparatus 1 by the base station apparatus 3 may be used for transmission on a PDCCH. Specifically, Cyclic Redundancy check (CRC) parity bits may be added to a DCI format (PDCCH). After the Cyclic Redundancy check (CRC) parity bits are added, the CRC parity bits may be scrambled by an RNTI. Here, the CRC parity bits added to the DCI format may be obtained from a payload of the DCI format. Here, in the present embodiment, "CRC parity bits," "CRC bits," and "CRC" may be identical. A "PDCCH on which a DCI format provided with CRC parity bits is transmitted," a "PDCCH including CRC parity bits and including a DCI format," a "PDCCH including CRC parity bits," and a "PDCCH including a DCI format" may be identical. A "PDCCH including X" and a "PDCCH with X" may be identical. The terminal apparatus 1 may monitor a DCI format. The terminal apparatus 1 may monitor DCI. The terminal apparatus 1 may monitor a PDCCH.

The terminal apparatus 1 attempts to decode a PDCCH to which CRC parity bits scrambled by an RNTI are added, and detects a PDCCH that succeeded in the CRC as a PDCCH addressed to the terminal apparatus 1 (also referred to as blind decoding). In other words, the terminal apparatus 1 may detect the PDCCH with the CRC scrambled by the RNTI. The terminal apparatus 1 may detect the PDCCH including the DCI format to which the CRC parity bits scrambled by the RNTI are added.

For example, the above-mentioned Cell-Radio Network Temporary Identifier (C-RNTI) may be an identifier that is unique to the terminal apparatus 1 and is used for identification in RRC connection and scheduling. The C-RNTI may be used for dynamically scheduled unicast transmission.

For example, to detect a group common PDCCH, the base station apparatus 3 may allocate a G-RNTI to the terminal apparatus 1. In other words, detection of a group common PDCCH may be provided based on at least a G-RNTI allocated to the terminal apparatus 1. The Group Radio Network Temporary Identifier (G-RNTI) may be at least used for common information transmission. A value of the G-RNTI may be notified to the terminal apparatus 1 for reception of the information. The value of the G-RNTI may be a value predetermined in a specification or the like. CRC parity bits added to a group common PDCCH used for common information reception may be scrambled by the G-RNTI. The terminal apparatus 1 may monitor group common PDCCHs in a search space, and may detect a group common PDCCH addressed to the terminal apparatus 1.

The PDCCH candidate corresponds to multiple Control Channel Elements (CCEs). The CCE includes multiple resource element groups (REGs). The REG is one RB in one OFDM symbol. The REG may include a reference signal used to demodulate the REG. One CCE may be provided by a prescribed number of resource elements. The number of CCEs corresponding to the PDCCH candidate is referred to as an aggregation level.

A slot structure according to the present embodiment will be described below.

Figure 3:
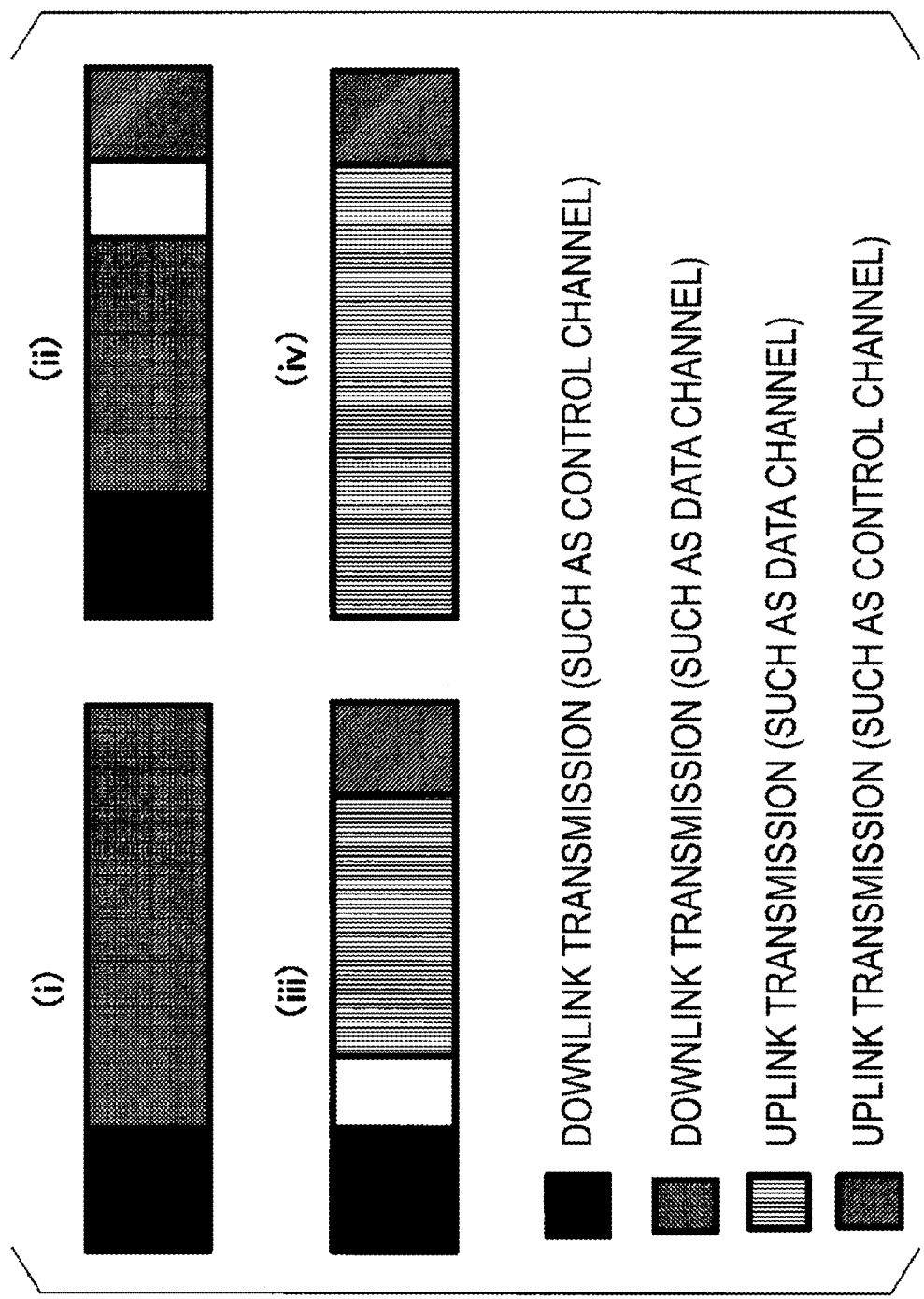
FIG. 3 is a diagram illustrating examples of slot structures according to the present embodiment.

In the present embodiment, a slot structure (slot type, slot format) includes at least four types. FIG. 3 is a diagram illustrating examples of slot structures according to the present embodiment.

A slot structure according to the present embodiment includes (i) a downlink only slot, (ii) a downlink centric slot, (iii) an uplink centric slot, and (iv) an uplink only slot.

As in FIG. 3, all symbols constituting the downlink only slot of (i) may be used for downlink transmission. A part of symbols constituting the slot may be used for a gap. A part of symbols constituting the slot may be reserved as a blank symbol. In other words, the downlink only slot need not be used for uplink transmission. In other words, the terminal apparatus need not expect scheduling of uplink transmission in the downlink only slot.

The downlink centric slot of (ii) is a slot including a downlink, a gap, and an uplink. Here, the downlink centric slot is mainly used for transmission of downlink data (such as downlink control data and/or downlink user data). A part of symbols in the downlink centric slot may be used for transmission of uplink data (such as uplink control data and/or uplink user data). In the downlink centric slot, the number of symbols used for uplink transmission may be larger than the number of symbols used for downlink transmission.

The uplink centric slot of (iii) is a slot including a downlink, a gap, and an uplink. The uplink centric slot is mainly used for transmission of uplink data (such as uplink control data and/or uplink user data). A part of symbols in the uplink centric slot may be used for transmission of downlink data (such as downlink control data and/or downlink user data). In the uplink centric slot, the number of symbols used for downlink transmission may be larger than the number of symbols used for uplink transmission.

All symbols constituting the uplink only slot of (iv) may be used for uplink transmission. A part of symbols constituting the slot may be used for a gap. A part of symbols constituting the slot may be reserved as a blank symbol. In other words, the uplink only slot need not be used for downlink transmission. In other words, the terminal apparatus need not receive a downlink physical channel in the uplink only slot.

In the present embodiment, group information of slot structures may be transmitted on a group common PDCCH. The group information indicates multiple slot structures belonging to the group. For example, a first slot structure group includes a downlink only slot, a downlink centric slot, and an uplink centric slot. A second slot structure group may include a downlink only slot, a downlink centric slot, an uplink centric slot, and a blank slot. A third slot structure group includes an uplink only slot. A fourth slot structure group may include an uplink only slot and a blank slot.

In the present embodiment, the group common PDCCH may include information related to a slot structure. In the present embodiment, the group common PDCCH may include information related to slot structures of a current slot and a next slot. The current slot is a slot in which a group common PDCCH is received. The next slot is a slot immediately following the slot in which the group common PDCCH is received. The base station apparatus 3 may transmit information related to slot structures for a current slot and/or a next slot to the terminal apparatus 1 on a group common PDCCH.

In the present embodiment, the base station apparatus 3 may separately allocate, to a group common PDCCH, fields indicating slot structures related to a current slot and a next slot. In other words, the base station apparatus 3 may allocate two fields to a group common PDCCH. A first field may indicate a slot structure of a current slot, and a second field may indicate a slot structure of a next slot. In other words, a group common PDCCH may include a first field and a second field. The terminal apparatus 1 is notified of slot structures of a current slot and a next slot, based on the respective fields.

The number of bits of each of the first field indicating a slot structure of a current slot and the second field indicating a slot structure of a next slot may be configured to be the same as each other, or may be configured to be different from each other. For example, the number of bits of each of the first field and the second field may be two bits. FIGS. 4A to 4C are examples of a field mapped to a slot structure according to the present embodiment. FIG. 4A is an example of a case where the number of bits of the first field is configured to be two bits. FIG. 4B is an example of a case that the number of bits of the second field is configured to be two bits. In this case, the terminal apparatus 1 may refer to the first field and the second field included in a detected group common PDCCH with FIGS. 4A and 4B, respectively, to determine slot structures of a current slot and a next slot. In FIG. 4A, in a case that the first field is mapped to 00, the terminal apparatus 1 may determine that a slot structure of a current slot is to be a downlink only slot. In FIG. 4A, in a case that the first field is mapped to 11, the terminal apparatus 1 may regard the slot as a blank slot. The terminal apparatus 1 does not perform downlink reception and uplink transmission in a blank slot. The terminal apparatus 1 need not monitor a UE-specific PDCCH in a blank slot. The terminal apparatus 1 may measure (receive) a first physical signal in a blank slot. For example, the first physical signal may be a reference signal used for measurement of a CSI-RS. The first physical signal may be a reference signal used for beam management and/or beam acquisition, and positioning. The first physical signal may be a reference signal used for time frequency synchronization, timing synchronization, and acquisition/detection of a cell ID. The terminal apparatus 1 need not receive a second physical signal in a blank slot. For example, the second physical signal may be a reference signal used for demodulation of a physical channel. For example, the second physical signal may be a reference signal used for performing channel compensation of a physical channel. In FIG. 4A, in a case that the first field is mapped to 11, the terminal apparatus 1 may regard that the slot is to be reserved for another purpose. In FIG. 4B, in a case that the second field is mapped to 00, the terminal apparatus 1 may determine that a next slot is to be a downlink only slot. In FIG. 4B, in a case that the second field is mapped to 01, the terminal apparatus 1 may determine that a slot structure of a next slot is to be a downlink centric slot. In FIG. 4B, in a case that the second field is mapped to 10, the terminal apparatus 1 may determine that a slot structure of a next slot is to be an uplink centric slot. In this case, the terminal apparatus 1 may monitor a PDCCH (such as a group common PDCCH and/or a UE-specific PDCCH) in a next slot. In FIG. 4B, in a case that the second field is mapped to 11, the terminal apparatus 1 may regard a next slot as an uplink only slot. In this case, the terminal apparatus 1 need not monitor a PDCCH (such as a group common PDCCH and/or a UE-specific PDCCH) in a next slot.

For example, the first field may be configured to be two bits, and the second field may be configured to be one bit. FIG. 4C is an example of a case that the number of bits of the second field is configured to be one bit. In this case, the terminal apparatus 1 may refer to the first field included in a detected group common PDCCH with FIG. 4A to determine a slot structure of a current slot. The terminal apparatus 1 may refer to the second field included in a detected group common PDCCH with FIG. 4C to determine a slot structure of a next slot. In FIG. 4C, in a case that the second field is mapped to 0, the terminal apparatus 1 may determine that a slot structure of a next slot is to be of type A. In a case that the second field is mapped to 1, the terminal apparatus 1 may determine that a slot structure of a next slot is to be of type B. Here, type A may correspond to the first slot structure group. Type A may correspond to the second slot structure group. Type B may correspond to the third slot structure group. Type B may correspond to the fourth slot structure group. In a case that the second field is mapped to 0, the terminal apparatus 1 may monitor a group common PDCCH in a next slot. In the case that the second field is mapped to 0, the terminal apparatus 1 may monitor a UE-specific PDCCH in a next slot. In a case that the second field is mapped to 1, the terminal apparatus 1 need not monitor a group common PDCCH in a next slot. In the case that the second field is mapped to 1, the terminal apparatus 1 need not monitor a UE-specific PDCCH in a next slot.

The number of bits of the first field and the second field may be provided based on at least a part or all of description of a specification and pieces of information of a higher layer parameter provided in advance from the base station apparatus 3.

In the present embodiment, the base station apparatus 3 may configure one field that indicates slot structures related to a current slot and a next slot. In other words, the base station apparatus 3 may allocate one third field to a group common PDCCH. The third field may indicate a slot structure of a current slot and a slot structure of a next slot. The terminal apparatus 1 is notified of slot structures of a current slot and a next slot, based on the third field included in a received group common PDCCH.

The following description is directed to an example in which the base station apparatus 3 allocates the third field to a group common PDCCH. For example, the number of bits of the third field may be three bits. FIG. 5 is another example of a field mapped to a slot structure according to the present embodiment. FIG. 5 is an example of a case that the number of bits of the third field is configured to be three bits. The terminal apparatus 1 may refer to the third field included in a detected group common PDCCH with FIG. 5 to determine slot structures of a current slot and a next slot. For example, in a case that the third field is mapped to 010, the terminal apparatus 1 may refer to FIG. 5 to determine that a current slot is to be a downlink centric slot and a next slot is to be of type A. Here, type A and type B in FIG. 5 may be the same as type A and type B in FIG. 4C. In other words, in a case that a next slot is indicated as type A, the terminal apparatus 1 may monitor a group common PDCCH in the next slot. In a case that a next slot is indicated as type A, the terminal apparatus 1 may monitor a UE-specific PDCCH in the next slot. In a case that a next slot is indicated as type B, the terminal apparatus 1 need not monitor a group common PDCCH in the next slot. In a case that a next slot is indicated as type B, the terminal apparatus 1 need not monitor a UE-specific PDCCH in the next slot.

In the present embodiment, information indicating as to whether or not to monitor a group common PDCCH may be provided based on at least RRC signaling. In other words, the base station apparatus 3 may transmit RRC signaling indicating as to whether or not to monitor a group common PDCCH to the terminal apparatus 1. In a case that the terminal apparatus 1 receives RRC signaling indicating that a group common PDCCH is not to be monitored, the terminal apparatus 1 may end monitoring of a group common PDCCH. In a case that the terminal apparatus 1 receives RRC signaling indicating that a group common PDCCH is to be monitored, the terminal apparatus 1 may start monitoring of a group common PDCCH.

Figure 6A:
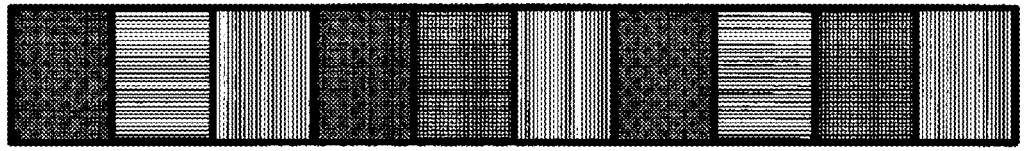
FIGS. 6A and 6B are diagrams of examples illustrating slot structure information of each slot according to the present embodiment.
Figure 6B:
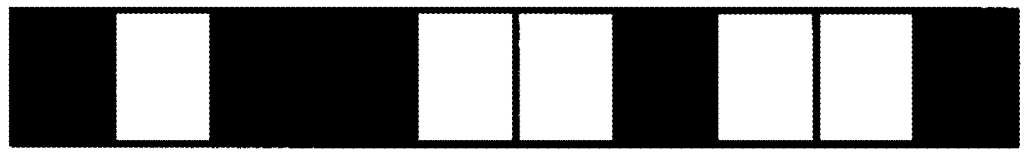

In the present embodiment, information indicating a slot structure may be provided based on at least RRC signaling. The base station apparatus 3 may transmit RRC signaling including an RRC parameter indicating slot structure information of each slot to the terminal apparatus 1. The terminal apparatus 1 receives RRC signaling including an RRC parameter indicating slot structure information of each slot, and is thereby notified of slot structure information of each slot. Then, based on at least the slot structure information of each slot, the terminal apparatus 1 may determine whether or not to monitor a group common PDCCH in the slot. FIGS. 6A and 6B are diagrams of examples illustrating slot structure information of each slot according to the present embodiment. As an example, as illustrated in FIG. 6A, the base station apparatus 3 may transmit RRC signaling including an RRC parameter indicating allocation of a slot structure of 10 ms to the terminal apparatus 1. Here, one slot corresponds to 1 ms. The terminal apparatus 1 may determine a slot structure of each slot, based on received RRC signaling. For example, in FIG. 6A, in a case that slot n is configured to be an uplink only slot, the terminal apparatus 1 need not monitor a group common PDCCH in the slot. In a case that slot n is configured to be an uplink only slot, the terminal apparatus 1 need not monitor a UE-specific PDCCH in the slot.

For example, in FIG. 6A, in a case that the slot n+1 is configured to be a downlink only slot, the terminal apparatus 1 may monitor a group common PDCCH in the slot n+1. In a case that the slot n+1 is configured to be a downlink only slot, the terminal apparatus 1 need not monitor a UE-specific PDCCH in the slot n+1.

Information indicating as to whether or not to monitor a group common PDCCH may be provided based on at least RRC signaling. In other words, the base station apparatus 3 may transmit, to the terminal apparatus 1, RRC signaling including an RRC parameter indicating information of a slot in which a group common PDCCH is to be monitored according to a given indication. Here, the information of a slot may be index information of a slot. In other words, the base station apparatus 3 may notify the terminal apparatus 1 of index information of a slot in which a group common PDCCH is to be monitored according to a given indication, and/or index information of a slot in which a group common PDCCH is not to be monitored according to a given indication. In a case that the terminal apparatus 1 receives RRC signaling including an RRC parameter indicating information of a slot in which a group common PDCCH is to be monitored according to a given indication, the terminal apparatus 1 is notified of in which slot a group common PDCCH is to be monitored. As an example, as illustrated in FIG. 6B, the base station apparatus 3 may transmit, to the terminal apparatus 1, RRC signaling including an RRC parameter indicating information of a slot in which a group common PDCCH is to be monitored according to a given indication, based on allocation of a slot of 10 ms. The terminal apparatus 1 may determine whether or not to monitor a group common PDCCH in each slot, based on received RRC signaling. For example, in FIG. 6B, in a case that an RRC parameter does not indicate that a group common PDCCH is to be monitored in slot n, the terminal apparatus 1 need not monitor a group common PDCCH in the slot n. In a case that an RRC parameter does not indicate that a group common PDCCH is to be monitored in slot n, the terminal apparatus 1 need not monitor a UE-specific PDCCH in the slot n.

For example, in FIG. 6B, in a case that an RRC parameter indicates that a group common PDCCH is to be monitored in slot n+1, the terminal apparatus 1 may monitor a group common PDCCH in the slot n+1. In a case that an RRC parameter indicates that a group common PDCCH is to be monitored in slot n+1, the terminal apparatus 1 may monitor a UE-specific PDCCH in the slot n+1.

In the following description, the RRC parameter includes a first RRC parameter indicating slot structure information of each slot, and a second RRC parameter indicating information of a slot in which a group common PDCCH is to be monitored according to a given indication.

The following description is directed to a determination method of the terminal apparatus 1 as to whether or not to monitor a group common PDCCH, based on the above-mentioned RRC parameter and the slot structure information indicated by a field included in a group common PDCCH, according to the present embodiment.

The determination method is as follows. Specifically, the base station apparatus 3 transmits RRC signaling including an RRC parameter indicating whether or not to monitor a group common PDCCH. The base station apparatus 3 also allocates a field indicating slot structure information of a slot n to a group common PDCCH in n−1. The terminal apparatus 1 determines whether or not to monitor a group common PDCCH in the slot n, based on at least (i) the slot structure information indicated by the field allocated to the group common PDCCH in the slot n−1, and (ii) the RRC parameter included in the RRC signaling.

As described above, the field indicating information of a lot structure included in a group common PDCCH may be the second field indicating a slot structure of a next slot. The field included in a group common PDCCH may be the third field indicating a slot structure of a next slot. The field indicating slot structure information included in a group common PDCCH is transmitted in one slot that precedes the slot in which whether or not to monitor a group common PDCCH is determined. In other words, a field indicating slot structure information included in a group common PDCCH is used in one slot that follows the slot in which the group common PDCCH is transmitted. Specifically, in a case that the terminal apparatus 1 detects a group common PDCCH including a field indicating slot structure information in a slot n−1, the terminal apparatus 1 may determine whether or not to monitor a group common PDCCH in a slot n, based on at least the slot structure information included in the group common PDCCH.

The following description is given of whether or not to monitor a group common PDCCH, based on an RRC parameter, in a case that the terminal apparatus 1 does not receive a field included in a group common PDCCH. In other words, in a case that the terminal apparatus 1 does not detect or monitor a group common PDCCH in a preceding slot, whether or not to monitor a group common PDCCH in a current slot may be determined based on an RRC parameter included in RRC signaling.

Specifically, in a case that the terminal apparatus 1 does not detect a group common PDCCH in slot n−1, the terminal apparatus 1 may determine whether or not to monitor a group common PDCCH in slot n, based on an RRC parameter included in a received RRC message. For example, in a case that the terminal apparatus 1 does not detect (monitor) a group common PDCCH in a slot n−1 and in a case that RRC signaling indicates that a group common PDCCH is to be monitored in a slot n, the terminal apparatus 1 may monitor a group common PDCCH in the slot n. For example, in a case that the terminal apparatus 1 does not detect (monitor) a group common PDCCH in the slot n−1 and in a case that RRC signaling does not indicate that a group common PDCCH is to be monitored in the slot n, the terminal apparatus 1 need not monitor a group common PDCCH in the slot n.

The following description is given of whether or not to monitor a group common PDCCH, based on at least an RRC parameter and/or slot structure information indicated by a group common PDCCH, in a case that the terminal apparatus 1 receives both of RRC signaling including an RRC parameter and a group common PDCCH. In other words, in a case that the terminal apparatus 1 detects a group common PDCCH in a slot n−1, the terminal apparatus 1 may determine whether or not to monitor a group common PDCCH in a slot n, based on at least slot structure information indicated by a field included in the detected group common PDCCH.

For example, in a case that the terminal apparatus 1 detects a group common PDCCH in a slot n−1 and that a field included in the detected group common PDCCH indicates that a next slot is of type A, the terminal apparatus 1 may monitor a group common PDCCH in a slot n independently of RRC signaling for indicating whether or not to monitor a group common PDCCH in the slot n. In other words, in a case that the terminal apparatus 1 detects a group common PDCCH in the slot n−1 and that a field included in the detected group common PDCCH indicates that a next slot is of type A, the terminal apparatus 1 may monitor a group common PDCCH in the slot n, which is a slot other than a slot in which a group common PDCCH is to be monitored according to a given indication. In a case that the terminal apparatus 1 detects a group common PDCCH in the slot n−1 and that a field included in the detected group common PDCCH indicates that a next slot is of type A, the terminal apparatus 1 may monitor a group common PDCCH in the slot n in which a group common PDCCH is to be monitored according to a given indication.

For example, in a case that the terminal apparatus 1 detects a group common PDCCH in a slot n−1 and that a field included in the detected group common PDCCH indicates that a next slot is of type B, the terminal apparatus 1 need not monitor a group common PDCCH in a slot n independently of RRC signaling for indicating whether or not to monitor a group common PDCCH in slot n. In other words, in a case that the terminal apparatus 1 detects a group common PDCCH in the slot n−1 and that a field included in the detected group common PDCCH indicates that a next slot is of type B, the terminal apparatus 1 need not monitor a group common PDCCH in a slot n which is a slot other than a slot in which a group common PDCCH is to be monitored according to a given indication. In a case that the terminal apparatus 1 detects a group common PDCCH in the slot n−1 and that a field included in the detected group common PDCCH indicates that a next slot is of type B, the terminal apparatus 1 need not monitor a group common PDCCH in the slot n in which a group common PDCCH is to be monitored according to a given indication.

In the following, in a case that the terminal apparatus 1 does not detect or monitor a group common PDCCH in a preceding slot, whether or not to monitor a group common PDCCH in a current slot may be determined based on information included in RRC signaling.

In the following, in a case that the base station apparatus 3 does not transmit (configure), to (for) the terminal apparatus 1, RRC signaling indicating whether or not to monitor a group common PDCCH in each slot, the terminal apparatus 1 may determine whether or not to monitor a group common PDCCH in slot n, based on slot structure information indicated by a field included in the group common PDCCH.

For example, in a case that the terminal apparatus 1 detects a group common PDCCH in a slot n−1 and that a field included in the detected group common PDCCH indicates that a next slot is of type A, the terminal apparatus 1 may monitor a group common PDCCH in the slot n.

For example, in a case that the terminal apparatus 1 detects a group common PDCCH in the slot n−1 and that a field included in the detected group common PDCCH indicates that a next slot is of type B, the terminal apparatus 1 need not monitor a group common PDCCH in the slot n. In this case, the terminal apparatus 1 need not monitor a UE-specific PDCCH in slot n.

For example, in a case that the terminal apparatus 1 does not detect a group common PDCCH in the slot n−1, the terminal apparatus 1 may monitor a group common PDCCH in the slot n.

In the following, in a case that the base station apparatus 3 configures, for the terminal apparatus 1, RRC signaling indicating that a group common PDCCH is to be monitored in all of the slots, the terminal apparatus 1 may determine whether or not to monitor a group common PDCCH in a slot n, based on slot structure information indicated by a field included in the group common PDCCH.

For example, in a case that the terminal apparatus 1 detects a group common PDCCH in a slot n−1 and that a field included in the detected group common PDCCH indicates that a next slot is of type A, the terminal apparatus 1 may monitor a group common PDCCH in a slot n.

For example, in a case that the terminal apparatus 1 detects a group common PDCCH in a slot n−1 and that a field included in the detected group common PDCCH indicates that a next slot is of type B, the terminal apparatus 1 need not monitor a group common PDCCH in slot n. In this case, the terminal apparatus 1 need not monitor a UE-specific PDCCH in a slot n.

For example, in a case that the terminal apparatus 1 does not detect a group common PDCCH in the slot n−1, the terminal apparatus 1 may monitor a group common PDCCH in the slot n.

A slot configuration according to the present embodiment will be described below.

The base station apparatus 3 may transmit RRC signaling including Slot Configuration information to the terminal apparatus 1. A slot configuration is used for a configuration of a part and/or all of three fields, namely, downlink duration (DL Duration), a gap (GP), and uplink duration (UL Duration). The terminal apparatus 1 may obtain at least a symbol structure for a downlink, a symbol structure for a gap, and a symbol structure for an uplink in a slot, based on slot configuration information of a slot included in received RRC signaling. The terminal apparatus 1 may perform switching from downlink reception processing to uplink transmission processing between gaps.

FIG. 7 is a diagram illustrating an example of a slot configuration according to the present embodiment. FIG. 7 illustrates types of allocation of slot configurations, using 2 bits. The base station apparatus 3 may allocate more than 2 bits to a 'slot configuration' field to configure more than four types of combinations. The terminal apparatus 1 may refer to a received 'slot configuration' field with FIG. 7 to determine a slot configuration to be used for the slot. S1 to S12 of FIG. 7 represent the length of duration. S1 to S12 of FIG. 7 may be represented by the number of symbols. Here, the number of symbols may be from 0 to 14. S1 to S12 may be represented by an integer multiple of a time unit Ts. Here, Ts may be equivalent to a sampling period (sampling interval, sampling rate) for a symbol corresponding to a certain subcarrier spacing. In other words, Ts may be a cycle of performing sampling for a time-continuous signal in a certain period of time. Here, through sampling of the time-continuous signal in a certain period of time, a time-discrete signal can be obtained. The time-discrete signal may be referred to as a sample, or a sampling signal. Note that the time-continuous signal may be referred to as an analog signal. The time-discrete signal may be referred to as a digital signal. Ts may be a prescribed value that is independent of a subcarrier spacing and a sampling size. Ts may be determined based on a sampling size for the time-continuous signal in a certain period of time. In other words, Ts can be rephrased as a time interval between adjacent time-discrete signals. Here, the sampling size may be referred to as the number of times sampling is performed, the number of sampling points, a sample size, or the number of samples. The sampling size may be determined based on a Fast Fourier Transform (FFT) size and/or an Inverse FFT (IFFT) size.

The terminal apparatus 1 may determine slot structure information of a slot in which a group common PDCCH including a slot configuration' field has been received, based on at least a determined slot configuration. For example, in FIG. 7, in a case that S1 is configured to be 14 symbols and that S2 and S3 are configured to be 0 symbols, the terminal apparatus 1 may regard the slot as a downlink only. For example, in a case that S1 is configured to be 10 symbols, that S2 is configured to be 2 symbols, and that S3 is configured to be 2 symbols, the terminal apparatus 1 may regard the slot as a downlink centric slot. In other words, the terminal apparatus 1 may determine a slot structure of the slot, based on the number of symbols constituting downlink duration, a gap, and uplink duration. In this case, the base station apparatus 3 need not transmit a field indicating slot structure information of a current slot. In other words, the 'slot configuration' field may implicitly indicate a structure (type) of a slot. The base station apparatus 3 may notify the terminal apparatus 1 of which slot configuration is to be used, on a group common PDCCH. The terminal apparatus 1 is notified of a symbol structure of each field of a slot, based on a notified slot configuration. For example, in a case of FIG. 7, the base station apparatus 3 allocates a 'slot configuration' field having 2 bits. The terminal apparatus 1 may determine any one slot configuration, based on a value mapped to the 'slot configuration' field having 2 bits.

For example, FIG. 7 may be defined as a diagram of slot configurations of each slot structure of a slot. Each slot structure has allocation of a slot configuration of its own. In other words, the base station apparatus 3 may configure multiple slot configurations as in FIG. 7 for a downlink only slot. The base station apparatus 3 may configure multiple slot configurations as in FIG. 7 for a downlink centric slot. The base station apparatus 3 may configure multiple slot configurations as in FIG. 7 for a downlink centric slot. The base station apparatus 3 may configure multiple slot configurations as in FIG. 7 for an uplink centric slot. The base station apparatus 3 may configure multiple slot configurations as in FIG. 7 for an uplink only slot. Subsequently, the base station apparatus 3 transmits allocation of a slot configuration configured for each slot structure of a slot to the terminal apparatus 1 through RRC signaling. Here, the slot configuration may be a value that is defined in a specification or the like, and is known between the base station apparatus 3 and the terminal apparatus 1. Then, the terminal apparatus 1 may determine any one slot configuration, based on both of the first field and the 'slot configuration' field included in a group common PDCCH. In other words, the base station apparatus 3 transmits the first field indicating a slot structure of a current slot and a 'slot configuration' field to the terminal apparatus 1, on a group common PDCCH. The terminal apparatus 1 may determine a slot structure of a current slot, based on the first field included in a received group common PDCCH. Subsequently, with reference to a diagram of slot configurations used for a determined slot structure, the terminal apparatus 1 may determine any one slot configuration, based on a value mapped to the 'slot configuration' field.

FIGS. 8A to 8D are diagrams illustrating other examples of a slot configuration according to the present embodiment. In FIGS. 8A to 8D, FIG. 8A is an example of a slot configuration of a downlink only slot. FIG. 8B is an example of a slot configuration of a downlink centric slot. FIG. 8C is an example of a slot configuration of an uplink centric slot. FIG. 8D is an example of a slot configuration of an uplink only slot. A slot configuration may be transmitted from the base station apparatus 3 to the terminal apparatus 1 through RRC signaling. Each of the slot configurations of FIGS. 8A to 8D may be a value that is defined in a specification or the like, and is known between the base station apparatus 3 and the terminal apparatus 1.

With reference to FIGS. 8A to 8D, 14 symbols constituting a slot are used for a part or all of a downlink (D), a gap (G), and an uplink (U). Here, G may indicate a blank symbol. Each of numbers from 0 to 13 in FIGS. 8A to 8D may be, in one slot, a number (index number) of a symbol constituting a slot. The terminal apparatus 1 may perform switching from downlink reception processing to uplink transmission processing in a gap between a downlink and an uplink. A symbol used for a gap between a downlink and an uplink may be reserved for another purpose. A symbol used for a gap between an uplink and an uplink may be reserved for another purpose. The base station apparatus 3 transmits the first field indicating a slot structure of a current slot and a 'slot configuration' field to the terminal apparatus 1, on a group common PDCCH. The terminal apparatus 1 may determine a slot structure of a current slot, based on the first field included in a received group common PDCCH. Subsequently, with reference to slot configurations of a slot used for a determined slot structure, the terminal apparatus 1 may determine any one slot configuration, based on a value mapped to the 'slot configuration' field.

As one example, the terminal apparatus 1 determines that a slot structure of a current slot is to be a downlink only slot, based on the first field included in a group common PDCCH received by the terminal apparatus 1. In this case, the terminal apparatus 1 may refer to a 'slot configuration' field included in the detected group common PDCCH with FIG. 8A to determine any one slot configuration, based on a value mapped to the 'slot configuration' field.

As one example, the terminal apparatus 1 determines that a slot structure of a current slot is to be an uplink centric slot, based on the first field included in a group common PDCCH received by the terminal apparatus 1. In this case, the terminal apparatus 1 may refer to a 'slot configuration' field included in the detected group common PDCCH with FIG. 8C to determine any one slot configuration, based on a value mapped to the 'slot configuration' field.

Each configuration of the apparatuses according to the present embodiment will be described below.

FIG. 5 is a schematic block diagram illustrating a configuration of the base station apparatus 3 according to the present embodiment. As illustrated in the drawing, the base station apparatus 3 includes a higher layer (higher layer control information notification unit) 501, a controller (base station controller) 502, a codeword generation unit 503, a downlink subframe generation unit 504, an OFDM signal transmission unit (downlink transmitter) 506, a transmit antenna (base station transmit antenna) 507, a receive antenna (base station receive antenna) 508, an SC-FDMA/OFDM signal reception unit (channel state measurement unit and/or CSI receiver) 509, and an uplink subframe processing unit 510. The downlink subframe generation unit 504 includes a downlink reference signal generation unit 505, a resource element map processing unit 512, and a baseband signal generation processing unit. The uplink subframe processing unit 510 includes an uplink control information extraction unit (CSI acquisition unit/HARQ-ACK acquisition unit/SR acquisition unit) 511. Note that the SC-FDMA/OFDM signal reception unit 509 also serves as a measurement unit for a received signal, Clear Channel Assessment (CCA), and interference noise power. Note that, in a case that the terminal apparatus 1 supports transmission of OFDM signals, the SC-FDMA/OFDM signal reception unit 509 may be an OFDM signal reception unit. In a case that the terminal apparatus 1 supports transmission of SC-FDMA (DFT-S-OFDM) signals, the SC-FDMA/OFDM signal reception unit 509 may be an SC-FDMA signal reception unit. Note that, although not illustrated, a transmitter that transmits a Timing Advance (TA) command may be included in the base station apparatus 3.

The downlink subframe generation unit 504 may be a downlink Transmit Time Interval (TTI) generation unit, or may include a downlink TTI generation unit. The downlink TTI generation unit may generate a physical channel and/or a physical signal constituting a downlink TTI. In other words, the downlink subframe generation unit 504 including a downlink TTI generation unit may generate a sequence for a physical channel and/or a physical signal to be transmitted. The resource element map processing unit 512 included in the downlink subframe generation unit 504 may map a generated sequence to a physical resource (physical resource element). Note that the same may be applied to an uplink. The downlink subframe generation unit 504 may include a downlink slot generation unit. In other words, the downlink subframe generation unit 504 may generate a physical channel and/or a physical signal to be transmitted in a downlink slot. The downlink subframe generation unit 504 may include a downlink mini-slot generation unit. In other words, the downlink subframe generation unit 504 may generate a physical channel and/or a physical signal to be transmitted in a downlink mini-slot. The downlink subframe generation unit 504 may configure slot structure information of a slot, according to whether the slot structure information is for downlink transmission or uplink reception for a slot. The resource element map processing unit 512 may have a capability of performing processing of mapping a downlink transmission symbol (transmission bit, transmission data) of each transmit antenna port to a resource element. The resource element map processing unit 512 need not perform processing of mapping a transmission symbol to a resource element reserved for a guard band.

A baseband signal generation processing unit 513 included in the downlink subframe generation unit 504 may have a capability of converting a downlink transmission symbol (transmission bit, transmission data) mapped to a resource element into an OFDM baseband signal. Examples of the processing of converting a transmission symbol into an OFDM baseband signal may include an Inverse Fast Fourier Transform (IFFT), Windowing, and Filter processing. In the baseband signal generation processing unit 513, whether or not to perform processing of converting a transmission bit mapped to a resource element into a baseband signal may be provided based on information included in higher layer signaling. In the baseband signal generation processing unit 513, whether or not to perform processing of converting a transmission bit mapped to a resource element into a baseband signal may be provided based on information included in a control channel. In the baseband signal generation processing unit 513, whether or not to perform processing of converting a transmission bit mapped to a resource element into a baseband signal may be provided based on information configured in advance.

The uplink subframe processing unit 510 may include an uplink slot processing unit. In other words, the uplink subframe processing unit 510 may perform processing for a physical channel and/or a physical signal transmitted in an uplink slot. The uplink subframe processing unit 510 may include an uplink mini-slot processing unit. In other words, the downlink and uplink subframe processing unit 510 may perform processing for a physical channel and/or a physical signal to be transmitted in an uplink mini-slot.

Figure 10:
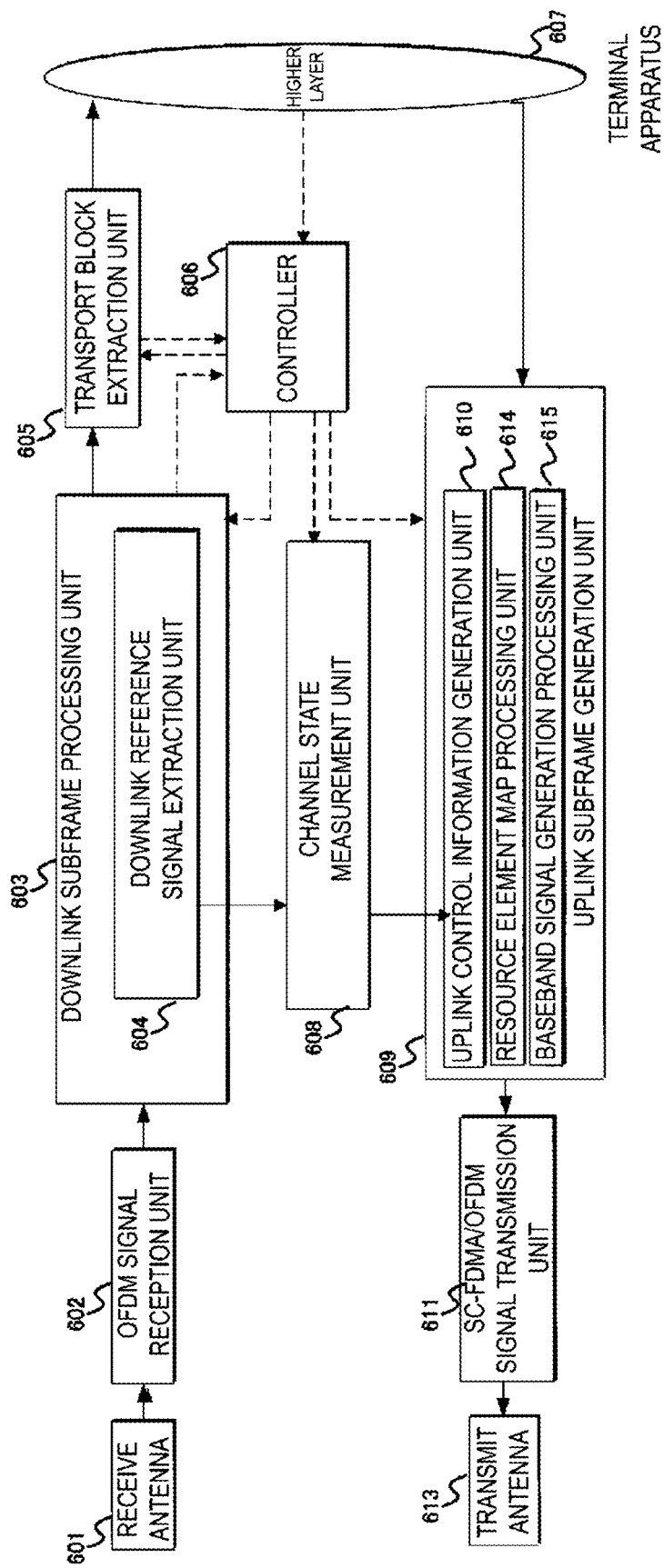
FIG. 10 is a schematic block diagram illustrating a configuration of a terminal apparatus 1 according to the present embodiment.

FIG. 10 is a schematic block diagram illustrating a configuration of the terminal apparatus 1 according to the present embodiment. As illustrated in FIG. 10, the terminal apparatus 1 includes a receive antenna (terminal receive antenna) 601, an OFDM signal reception unit (downlink receiver) 602, a downlink subframe processing unit 603, a transport block extraction unit (data extraction unit) 605, a controller (terminal controller) 606, a higher layer (higher layer control information acquisition unit) 607, a channel state measurement unit (CSI generation unit) 608, an uplink subframe generation unit 609, an SC-FDMA/OFDM signal transmission unit (UCI transmitter) 611, and a transmit antenna (terminal transmit antenna) 613. The downlink subframe processing unit 603 includes a downlink reference signal extraction unit 604. Note that the downlink subframe processing unit 603 may be a downlink TTI processing unit. The downlink subframe processing unit 603 may include a downlink slot processing unit. In other words, the downlink subframe processing unit 603 may perform processing for a physical channel and/or a physical signal to be transmitted in a downlink slot. The downlink subframe processing unit 603 may include a downlink mini-slot processing unit. In other words, the downlink subframe processing unit 603 may perform processing for a physical channel and/or a physical signal to be transmitted in a downlink mini-slot. The uplink subframe generation unit 609 includes an uplink control information generation unit (UCI generation unit) 610, a resource element map processing unit 614, and a baseband signal generation processing unit 615. Note that the OFDM signal reception unit 602 also serves as a measurement unit for a received signal, CCA, and interference noise power. In other words, in the OFDM signal reception unit 602, RRM measurement may be performed. In a case that the terminal apparatus 1 supports transmission of OFDM signals, the SC-FDMA/OFDM signal transmission unit may be an OFDM signal transmission unit. In a case that the terminal apparatus 1 supports transmission of SC-FDMA (DFT-S-OFDM) signals, the SC-FDMA/OFDM signal transmission unit may be an SC-FDMA signal transmission unit.

The uplink subframe generation unit 609 may be an uplink TTI generation unit, or may include an uplink TTI generation unit. The uplink TTI generation unit may generate a physical channel and/or a physical signal constituting an uplink TTI. In other words, the uplink subframe generation unit 609 including an uplink TTI generation unit may generate a sequence for a physical channel and/or a physical signal to be transmitted. The resource element map processing unit 614 included in the uplink subframe generation unit 609 may map a generated sequence to a physical resource (physical resource element). The uplink subframe generation unit 609 may include an uplink slot generation unit. In other words, the uplink subframe generation unit 609 may generate a physical channel and/or a physical signal to be transmitted in an uplink slot. The uplink subframe generation unit 609 may include an uplink mini-slot generation unit. In other words, the uplink subframe generation unit 609 may generate a physical channel and/or a physical signal to be transmitted in an uplink mini-slot. The resource element map processing unit 614 may have a capability of performing processing of mapping an uplink transmission symbol (transmission bit, transmission data) of each transmit antenna port to a resource element. The resource element map processing unit 614 need not perform processing of mapping an uplink transmission symbol to a resource element reserved for a guard band. The terminal apparatus 1 may include a power controller for controlling/setting transmit power for an uplink signal. Note that, although not illustrated, a measurement unit for measuring a time difference between reception and transmission of the terminal apparatus 1 may be included in the terminal apparatus 1. A transmitter that reports a measurement result of a time difference may be included in the terminal apparatus 1.

The baseband signal generation processing unit 615 included in the uplink subframe generation unit 609 may have a capability of converting an uplink transmission symbol (transmission bit, transmission data) mapped to a resource element into an OFDM baseband signal or an SC-FDMA baseband signal. Examples of the processing of converting an uplink transmission symbol into an OFDM baseband signal or an SC-FDMA baseband signal may include a Fast Fourier Transform (FFT), Inverse Fast Fourier Transform (IFFT), Windowing, and Filter processing. In the baseband signal generation processing unit 615, whether or not to perform processing of converting a transmission bit mapped to a resource element into a baseband signal may be provided based on information included in higher layer signaling. In the baseband signal generation processing unit 615, whether or not to perform processing of converting a transmission bit mapped to a resource element into a baseband signal may be provided based on information included in a control channel. In the baseband signal generation processing unit 615, whether or not to perform processing of converting a transmission bit mapped to a resource element into a baseband signal may be provided based on information configured in advance.

Figure 9:
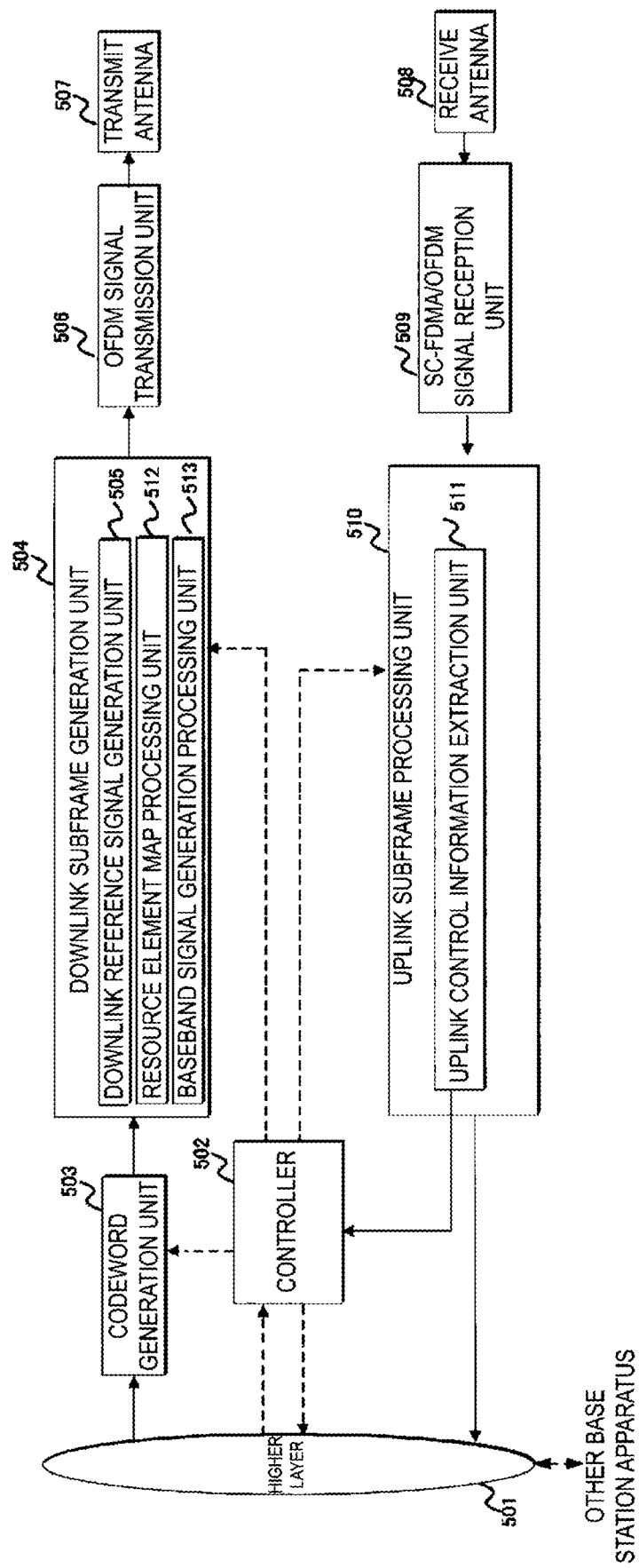
FIG. 9 is a schematic block diagram illustrating a configuration of a base station apparatus 3 according to the present embodiment.

In each of FIG. 9 and FIG. 10, the higher layer may include a Medium Access Control (MAC) layer, a Radio Link Control (RLC) layer, a Packet Data Convergence Protocol (PDCP) layer, and a Radio Resource Control (RRC) layer. Note that the higher layer may be referred to as a higher layer processing unit.

In the RLC layer, Acknowledged Mode (AM) data transmission is performed. The AM data transmission includes an indication that indicates that Transparent Mode (TM) data transmission, Unacknowledged Mode (UM) data transmission, and transmission of a higher layer Packet Data Unit (PDU) to a higher layer (such as a PDCP layer and an RRC layer) have succeeded. The RLC layer notifies a lower layer of a transmission opportunity, together with data transmission and all sizes of RLC PDUs transmitted in a transmission opportunity.

The RLC layer supports a capability related to transmission of a higher layer PDU, a capability related to error correction via an Automatic Repeat reQuest (ARQ) (only for AM data transmission), a capability related to concatenation/splitting/reconstruction of an RLC Service Data Unit (SDU) (only for UM and AM data transmission), a capability related to re-splitting of an RLC data PDU (for AM data transmission), a capability related to reordering of an RLC data PDU (only for AM data transmission), a capability related to duplicate detection (only for UM and AM data transmission), a capability related to discarding of an RLC SDU (only for UM and AM data transmission), a capability related to re-establishment of RLC, and a capability related to protocol error detection (only for AM data transmission).

First, a flow of transmission and/or reception of downlink data will be described with reference to FIG. 9 and FIG. 10. In the base station apparatus 3, the controller 502 holds a Modulation and Coding Scheme (MCS) indicating a modulation scheme, a coding rate, and the like in a downlink, a downlink resource allocation indicating RBs to be used for data transmission, and information to be used for HARQ control (a redundancy version, a HARQ process number, and a New Data Indicator (NDI)). The controller 502 controls the codeword generation unit 503 and the downlink subframe generation unit 504, based on these pieces of information. In the codeword generation unit 503, downlink data (also referred to as a downlink transport block, downlink shared data, a downlink shared transport block) transmitted from the higher layer 501 is processes through error correction coding, rate matching processing and the like, under the control of the controller 502, to generate a codeword. A maximum of two codewords is transmitted at the same time in one subframe of one cell. In the downlink subframe generation unit 504, a downlink subframe/downlink slot/downlink mini-slot is generated, in accordance with an indication of the controller 502. First, a codeword generated in the codeword generation unit 503 is converted into a modulation symbol sequence through a modulation process, such as Phase Shift Keying (PSK) modulation or Quadrature Amplitude Modulation (QAM). Moreover, a modulation symbol sequence is mapped onto REs of some RBs, and a downlink subframe/downlink slot/downlink mini-slot for each antenna port is generated through a precoding process. In this operation, a transmission data sequence transmitted from the higher layer 501 includes higher-layer control information, which is control information on the higher layer (e.g., dedicated (individual) RRC signaling). In the downlink reference signal generation unit 505, a downlink reference signal is generated. The resource element map processing unit 512 included in the downlink subframe generation unit 504 maps the downlink reference signal to REs in the downlink subframe/downlink slot/downlink mini-slot, in accordance with an indication of the controller 502. The downlink subframe/downlink slot/downlink mini-slot generated in the downlink subframe generation unit 504 is modulated into an OFDM signal in the OFDM signal transmission unit 506, and then transmitted via the transmit antenna 507. Although a configuration of including one OFDM signal transmission unit 506 and one transmit antenna 507 is provided as an example here, a configuration of including multiple OFDM signal transmission units 506 and transmit antennas 507 may be employed in a case that downlink subframes are transmitted on multiple antenna ports. The resource element map processing unit 512 included in the downlink subframe generation unit 504 may also have a capability of generating physical-layer downlink control channels, such as a physical control channel/physical shared channel, and mapping the physical-layer downlink control channels to REs in downlink slots/downlink mini-slots in downlink subframes. Each of multiple base station apparatuses transmits downlink slots or downlink mini-slots included in individual downlink subframes.

In the terminal apparatus 1, an OFDM signal is received by the OFDM signal reception unit 602 via the receive antenna 601, and an OFDM demodulation process is performed on the signal.

First, the downlink subframe processing unit 603 detects physical-layer downlink control channels, such as a physical control channel. More specifically, the downlink subframe processing unit 603 assumes that physical control channels have been transmitted in regions to which a physical control channel/physical shared channel is allocated, and thus decodes a signal. Then, the downlink subframe processing unit 603 checks Cyclic Redundancy Check (CRC) bits added to the signal in advance (blind decoding). In other words, the downlink subframe processing unit 603 monitors a physical control channel/physical shared channel. In a case that the CRC bits match an ID (a single terminal-specific identifier (UEID) assigned to a single terminal, such as a Cell-Radio Network Temporary Identifier (C-RNTI) and a Semi-Persistent Scheduling-C-RNTI (SPS-C-RNTI), or a Temporary C-RNTI) assigned by the base station apparatus in advance, the downlink subframe processing unit 603 recognizes that a physical control channel/physical shared channel has been detected. Then, the downlink subframe processing unit 603 extracts the physical shared channel by using DCI included in the detected physical control channel. The downlink subframe processing unit 603 acquires slot structure information included in the detected physical control channel, and recognizes a slot structure of the slot.

The control unit 606 holds an MCS indicating a modulation scheme, a coding rate, and the like in the downlink based on the control information, downlink resource allocation indicating RBs to be used for downlink data transmission, and information to be used for HARQ control, and controls the downlink subframe processing unit 603, the transport block extraction unit 605, and the like based on these elements. More specifically, the controller 606 performs control so as to perform RE mapping processing in the resource element map processing unit 512 included in the downlink subframe generation unit 504, RE demapping processing and demodulation processing for the modulation processing, and the like. The PDSCH extracted from the received downlink subframe is transmitted to the transport block extraction unit 605. The downlink reference signal extraction unit 604 in the downlink subframe processing unit 603 extracts a DLRS from a downlink subframe/downlink slot/downlink mini-slot. The controller 606 controls whether or not to monitor a physical control channel in a slot that follows the slot in which the physical control channel is detected, based on at least RRC signaling transmitted from the higher layer 501 of the base station apparatus 3 and the slot structure of the slot included in the detected physical control channel.

In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes the higher-layer control information, and the higher layer 607 notifies the control unit 606 of a necessary physical-layer parameter based on the higher-layer control information. Note that each of multiple base station apparatuses 3 transmits individual downlink subframes/downlink slots/downlink mini-slots, and the terminal apparatus 1 receives these. Therefore, the processing described above may be performed on each of downlink subframes/downlink slots/downlink mini-slots for each of multiple base station apparatuses 3. In this case, the terminal apparatus 1 may recognize or need not recognize that multiple downlink subframes/downlink slots/downlink mini-slots are transmitted from multiple base station apparatuses 3. In a case that the terminal apparatus 1 does not recognize such transmission, the terminal apparatus 1 may simply recognize that multiple downlink subframes/downlink slots/downlink mini-slots are transmitted in multiple cells. Moreover, the transport block extraction unit 605 determines whether the transport block has been detected correctly and transmits the determination result to the control unit 606.

Here, the transport block extraction unit 605 may include a buffer unit (soft buffer unit). In the buffer unit, information of an extracted transport block can be temporarily stored. For example, in a case that the transport block extraction unit 605 receives the same transport block (re-transmitted transport block) and that data decoding for this transport block has not succeeded, the transport block extraction unit 605 attempts to concatenate (synthesize) data for this transport block temporarily stored in the buffer unit with newly received data and to decode the concatenated data. After the temporarily stored data is no longer needed, or after a prescribed condition is satisfied, the buffer unit flushes the data. A condition for data to be flushed varies depending on a type of a transport block corresponding to data. The buffer unit may be prepared for each type of data. For example, as the buffer unit, a message 3 buffer and a HARQ buffer may be prepared, or L1/L2/L3 or the like may be prepared for each layer. Note that the meaning of flushing information/data includes flushing a buffer in which information and data are stored.

Next, a flow of uplink signal transmission and/or reception will be described. In the terminal apparatus 1, a downlink Reference Signal extracted by the downlink Reference Signal extraction unit 604 is transmitted to the channel state measurement unit 608 according to the indication from the control unit 606, the channel state and/or interference is measured in the channel state measurement unit 608, and CSI is further calculated based on the measured channel state and/or interference. In the channel state measurement unit 608, measurement of intensity of a beam from the base station apparatus 3, or detection of a resource corresponding to a beam may be performed. The control unit 606 indicates to the uplink control information generation unit 610 to generate an HARQ-ACK (DTX (not transmitted yet), ACK (detection succeeded), or NACK (detection failed)) and map the resultant to a downlink subframe based on the determination result of whether the transport block is correctly detected. The terminal apparatus 1 performs these processing on each of downlink subframes/downlink slots/downlink mini-slots of multiple cells. In the uplink control information generation unit 610, a PUCCH including the calculated CSI and/or HARQ-ACK, or a control channel/shared channel corresponding to a PUCCH is generated. In the uplink subframe generation unit 609, a physical shared channel including uplink data transmitted from the higher layer 607 and a physical control channel generated in the uplink control information generation unit 610 are mapped to RBs of uplink slots or uplink mini-slots in uplink subframes by the resource element map processing unit 614. In this manner, uplink slots or uplink mini-slots are generated.

An SC-FDMA signal or an OFDM signal is received by the SC-FDMA/OFDM signal reception unit 509 via the receive antenna 508, and SC-FDMA demodulation processing or OFDM demodulation processing is performed on the signal. In the uplink subframe processing unit 510, RBs to which physical control channels are mapped are extracted, in accordance with an indication of the controller 502. CSI included in the physical control channels are extracted in the uplink control information extraction unit 511. The extracted CSI is transmitted to the controller 502. The CSI is used for control of a downlink transmission parameter (MCS, downlink resource allocation, HARQ, transmission beam, reception beam, or the like) used by the controller 502.

Each of the units denoted by the reference signs 501 to 513 included in the base station apparatus 3 may be configured as a circuit. Each of the units denoted by the reference signs 601 to 615 included in the terminal apparatus 1 may be configured as a circuit.

Various aspects of the terminal apparatus 1 and the base station apparatus 3 according to the present embodiment will be described below.

(1) A first aspect of the present embodiment is a terminal apparatus 1. The terminal apparatus 1 includes a receiver

602 configured to receive higher layer signaling and a PDCCH. The higher layer signaling includes an RRC parameter for indicating a slot in which the PDCCH is to be monitored. The PDCCH includes slot structure information. The slot structure information indicates a slot structure for a slot n next to a slot in which the PDCCH is received. The terminal apparatus 1 includes a controller 606 configured to control whether or not to monitor a PDCCH in the slot n, based on at least the RRC parameter and the slot structure information.

(2) In the first aspect of the present embodiment, in a case that the RRC parameter indicates that the PDCCH is to be monitored in the slot n and that the slot structure information indicates that the slot structure in the slot n is an uplink only slot, the PDCCH is not monitored in the slot n. In a case that the RRC parameter indicates that the PDCCH is to be monitored in the slot n and that the slot structure information indicates that a slot structure of the slot n is a slot other than the uplink only slot, the PDCCH is monitored in the slot n.

(3) In the first aspect of the present embodiment, in a case that the PDCCH including the slot structure information is not detected in a slot n−1 and that the RRC parameter indicates that the PDCCH is to be monitored in the slot n, the PDCCH is monitored in the slot n. In a case that the PDCCH including the slot structure information is not detected in the slot n−1 and that the RRC parameter does not indicate that the PDCCH is to be monitored in the slot n, the PDCCH is not monitored in the slot n.

(4) A second aspect of the present embodiment is a base station apparatus 3. The base station apparatus 3 includes a transmitter 506 configured to transmit a PDCCH including slot structure information and RRC signaling. The RRC signaling includes an RRC parameter for indicating to a terminal apparatus whether to monitor the PDCCH in a slot n. The slot structure information included in the PDCCH transmitted in a slot n−1 indicates a slot structure of the slot n. The base station apparatus 3 includes a generation unit 504 configured to configure the slot structure information of the slot n, according to whether the slot n is for downlink transmission or uplink reception.

In the first aspect and the second aspect, the PDCCH may be a group common PDCCH.

According to these configurations, the terminal apparatus 1 is capable of efficiently monitoring a downlink.

A program running in the base station apparatus 3 and the terminal apparatus 1 according to one aspect of the present invention may be a program that controls a Central Processing Unit (CPU) and the like (a program that causes a computer to operate) in such a manner that the program realizes the functions of the embodiment described above according to one aspect of the present invention. Information handled in these apparatuses is temporarily stored in Random Access Memory (RAM) while the information is processed. After that, the information is stored in various types of Read Only Memory (ROM), such as Flash ROM, and a Hard Disk Drive (HDD). The information is read by the CPU, when necessary, to be modified or rewritten.

Note that a part of the terminal apparatus 1 and the base station apparatus 3 according to the embodiment described above may be achieved by a computer. In such a case, a part of the terminal apparatus 1 and the base station apparatus 3 may be achieved in the following manner. Specifically, a program for realizing such control functions is recorded in a computer-readable recording medium, and then a program recorded in this recording medium is read by a computer system so that the program is executed.

Note that the "computer system" mentioned herein refers to a computer system incorporated into the terminal apparatus 1 or the base station apparatus 3, and includes an OS and hardware components such as a peripheral apparatus. The "computer-readable recording medium" refers to a portable medium, such as a flexible disk, a magneto-optical disk, a ROM, a CD-ROM, and a storage apparatus incorporated into a computer system, such as a hard disk.

The "computer-readable recording medium" may include a medium that dynamically retains a program for a short period of time, such as a communication line that is used in a case of transmitting a program over a network such as the Internet or over a communication line such as a telephone line, and may include a medium that retains a program for a certain period of time, such as volatile memory within a computer system that functions as a server or a client in a case described above. The above-mentioned program may be a program configured to realize a part of the functions described above, and may be a program configured to be capable of realizing the functions described above in combination together with a program already recorded in a computer system.

The base station apparatus 3 according to the embodiment described above may be achieved as an aggregation (a group of apparatuses) including multiple apparatuses. Each of the apparatuses constituting a group of apparatuses may include a part or all portions of each function or each functional block of the base station apparatus 3 according to the embodiment described above. It is sufficient that, as a group of apparatuses, the apparatuses include each general function or each functional block of the base station apparatus 3. The terminal apparatus 1 according to the embodiment described above can also communicate with the base station apparatuses as an aggregation.

The base station apparatus 3 according to the embodiment described above may be an Evolved Universal Terrestrial Radio Access Network (EUTRAN). The base station apparatus 3 according to the embodiment described above may have a part or all portions of the functions of a node higher than an eNodeB.

A part or all portions of each of the terminal apparatus 1 and the base station apparatus 3 according to the embodiment described above may be typically achieved as an LSI, which is an integrated circuit, or may be achieved as a chip set. The functional blocks of each of the terminal apparatus 1 and the base station apparatus 3 may be individually formed as a chip, or a part or all of the functional blocks may be integrated to be formed as a chip. A circuit integration technique is not limited to the LSI. Realization with a dedicated circuit or a general-purpose processor may be possible. In a case that with advances in semiconductor technology, a circuit integration technology with which an LSI is replaced appears, it is also possible to use an integrated circuit based on the technology.

According to the embodiment described above, the terminal apparatus has been described as an example of a communication apparatus, but the present invention is not limited to the terminal apparatus described above, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Various modifications are possible within the scope of one aspect of the present invention defined by claims, and embodiments that are made by suitably combining technical means disclosed according to the different embodiments are also included in the technical scope of the present invention. A configuration in which constituent elements, described in the respective embodiments and having mutually the same effects, are substituted for one another is also included in the technical scope of the present invention.

INDUSTRIAL APPLICABILITY

One aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
501 Higher layer
502 Controller
503 Codeword generation unit
504 Downlink subframe generation unit
505 Downlink reference signal generation unit
506 OFDM signal transmission unit
507 Transmit antenna
508 Receive antenna
509 SC-FDMA/OFDM signal reception unit
510 Uplink subframe processing unit
511 Uplink control information extraction unit
512 Resource element map processing unit
513 Baseband signal generation processing unit
601 Receive antenna
602 OFDM signal reception unit
603 Downlink subframe processing unit
604 Downlink reference signal extraction unit
605 Transport block extraction unit
606 Controller
607 Higher layer
608 Channel state measurement unit
609 Uplink subframe generation unit
610 Uplink control information generation unit
611 SC-FDMA/OFDM signal transmission unit
613 Transmit antenna
614 Resource element map processing unit
615 Baseband signal generation processing unit

The invention claimed is:

1. A terminal apparatus comprising:
a receiver configured to:
receive radio resource control (RRC) information, the RRC information including an RRC parameter that instructs the terminal apparatus to monitor a first group common physical downlink control channel (PDCCH) and a second group common PDCCH in a plurality of slots; and
receive the first group common PDCCH in a first slot of the plurality of slots, the first group common PDCCH indicating slot format information for a second slot of the plurality of slots, the slot format information indicating a row of a table of slot formats, the row of the table indicating a slot format of the second slot of the plurality of slots, the slot format including at least a number of downlink symbols, and a number of uplink symbols; and
a controller configured to:
determine whether to monitor the second group common PDCCH in the second slot of the plurality of slots, based on the slot format information, in a case that the second slot of the plurality of slots is indicated by the RRC parameter for monitoring the second group common PDCCH; and
in a case that the first group common PDCCH in the first slot of the plurality of slots is not detected, monitor the second group common PDCCH in the second slot of the plurality of slots when the second slot of the plurality of slots is indicated by the RRC parameter for monitoring the second group common PDCCH.

2. The terminal apparatus according to claim 1, wherein in a case that the slot format of the second slot of the plurality of slots is indicated as an uplink-only slot that does not include downlink symbols, the controller is further configured not to monitor the second group common PDCCH in the second slot of the plurality of slots.

3. A base station apparatus comprising:
a transmitter configured to:
transmit radio resource control (RRC) information, the RRC information including an RRC parameter that instructs a terminal apparatus to monitor a first group common physical downlink control channel (PDCCH) and a second group common PDCCH in a plurality of slots; and
transmit the first group common PDCCH in a first slot of the plurality of slots, the first group common PDCCH indicating slot format information for a second slot of the plurality of slots, the slot format information indicating a row of a table of slot formats, the row of the table indicating a slot format of the second slot of the plurality of slots, the slot format including at least a number of downlink symbols, and a number of uplink symbols; and
a controller configured to control whether to transmit the second group common PDCCH in the second slot of the plurality of slots, based on the slot format information, in a case that the second slot of the plurality of slots is indicated to the terminal apparatus by the RRC parameter for monitoring the second group common PDCCH; and
in a case that the first group common PDCCH in the first slot of the plurality of slots is not transmitted, transmit the second group common PDCCH in the second slot of the plurality of slots when the second slot of the plurality of slots is indicated to the terminal apparatus by the RRC parameter for monitoring the second group common PDCCH.

4. The base station apparatus according to claim 3, wherein in a case that the slot format of the second slot of the plurality of slots is indicated as an uplink-only slot that does not include downlink symbols, the transmitter is further configured not to transmit the second group common PDCCH in the second slot of the plurality of slots.

5. A communication method used by a terminal apparatus, the communication method comprising:
receiving radio resource control (RRC) information, the RRC information including an RRC parameter that instructs the terminal apparatus to monitor a first group common physical downlink control channel (PDCCH) and a second group common PDCCH in a plurality of slots;

receiving the first group common PDCCH in a first slot of the plurality of slots, the first group common PDCCH indicating slot format information for a second slot of the plurality of slots, the slot format information indicating a row of a table of slot formats, the row of the table indicating a slot format of the second slot of the plurality of slots, the slot format including at least a number of downlink symbols, and a number of uplink symbols;

determining whether to monitor the second group common PDCCH in the second slot of the plurality of slots, based on the slot format information, in a case that the second slot of the plurality of slots is indicated by the RRC parameter for monitoring the second group common PDCCH; and in a case that the first group common PDCCH in the first slot of the plurality of slots is not detected, monitoring the second group common PDCCH in the second slot of the plurality of slots when the second slot of the plurality of slots is indicated by the RRC parameter for monitoring the second group common PDCCH.

6. A communication method used by a base station apparatus, the communication method comprising:

transmitting radio resource control (RRC) information, the RRC information including an RRC parameter that instructs a terminal apparatus to monitor a first group common physical downlink control channel (PDCCH) and a second group common PDCCH in a plurality of slots;

transmitting the first group common PDCCH in a first slot of the plurality of slots, the first group common PDCCH indicating slot format information for a second slot of the plurality of slots, the slot format information indicating a row of a table of slot formats, the row of the table indicating a slot format of the second slot of the plurality of slots, the slot format including at least a number of downlink symbols, and a number of uplink symbols;

determining whether to transmit the second group common PDCCH in the second slot of the plurality of slots, based on the slot format information, in a case that the second slot of the plurality of slots is indicated to the terminal apparatus by the RRC parameter for monitoring the second group common PDCCH; and in a case that the first group common PDCCH in the first slot of the plurality of slots is not transmitted, transmitting the second group common PDCCH in the second slot of the plurality of slots when the second slot of the plurality of slots is indicated to the terminal apparatus by the RRC parameter for monitoring the second group common PDCCH.

7. An integrated circuit mounted in a terminal apparatus, the integrated circuit comprising:

a receiver circuit configured to:
receive radio resource control (RRC) information, the RRC information including an RRC parameter that instructs the terminal apparatus to monitor a first group common physical downlink control channel (PDCCH) and a second group common PDCCH in a plurality of slots; and receive the first group common PDCCH in a first slot of the plurality of slots, the first group common PDCCH indicating slot format information for a second slot of the plurality of slots, the slot format information indicating a slot format of the second slot by an index to a row of a table of slot configuration, the row of the table including at least a number of downlink symbols, and a number of uplink symbols; and a control circuit configured to:
determine whether to monitor the second group common PDCCH in the second slot of the plurality of slots, based on the slot format information, in a case that the second slot of the plurality of slots is indicated by the RRC parameter for monitoring the second group common PDCCH; and in a case that the first group common PDCCH in the first slot of the plurality of slots is not detected, monitor the second group common PDCCH in the second slot of the plurality of slots when the second slot of the plurality of slots is indicated by the RRC parameter for monitoring the second group common PDCCH.

8. An integrated circuit mounted in a base station apparatus, the integrated circuit comprising:

a transmitter circuit configured to:
transmit radio resource control (RRC) information, the RRC information including an RRC parameter that instructs a terminal apparatus to monitor a first group common physical downlink control channel (PDCCH) and a second group common PDCCH in a plurality of slots; and transmit the first PDCCH in a first slot of the plurality of slots, the first group common PDCCH indicating slot format information for a second slot of the plurality of slots, the slot format information indicating a row of a table of slot formats, the row of the table indicating a slot format of the second slot of the plurality of slots, the slot format including at least a number of downlink symbols, and a number of uplink symbols; and a control circuit configured to:
determine whether to transmit the second group common PDCCH in the second slot of the plurality of slots, based on the slot format information, in a case that the second slot of the plurality of slots is indicated to the terminal apparatus by the RRC parameter for monitoring the second group common PDCCH; and in a case that the first group common PDCCH in the first slot of the plurality of slots is not transmitted, transmit the second group common PDCCH in the second slot of the plurality of slots when the second slot of the plurality of slots is indicated to the terminal apparatus by the RRC parameter for monitoring the second group common PDCCH.

* * * * *